US011153928B2

(12) United States Patent
Tsuboi et al.

(10) Patent No.: US 11,153,928 B2
(45) Date of Patent: Oct. 19, 2021

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, New Territories (HK)

(72) Inventors: Hidekazu Tsuboi, Sakai (JP); Shohei Yamada, Sakai (JP); Takako Hori, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/759,520

(22) PCT Filed: Nov. 12, 2018

(86) PCT No.: PCT/JP2018/041839
§ 371 (c)(1),
(2) Date: Apr. 27, 2020

(87) PCT Pub. No.: WO2019/098156
PCT Pub. Date: May 23, 2019

(65) Prior Publication Data
US 2020/0314946 A1  Oct. 1, 2020

(30) Foreign Application Priority Data

Nov. 15, 2017  (JP) .............................. JP2017-219903

(51) Int. Cl.
*H04W 8/24* (2009.01)
*H04W 76/27* (2018.01)
(Continued)

(52) U.S. Cl.
CPC ............ *H04W 76/27* (2018.02); *H04L 5/0092* (2013.01); *H04W 8/24* (2013.01); *H04W 24/10* (2013.01)

(58) Field of Classification Search
CPC ....... H04W 76/27; H04W 8/24; H04W 24/10; H04W 36/0085; H04W 76/20; H04L 5/0092; H04L 5/0094
See application file for complete search history.

(56) References Cited

U.S. PATENT DOCUMENTS

2019/0132862 A1*  5/2019  Jeon ...................... H04L 5/0064
2020/0213065 A1*  7/2020  Takeda .................. H04L 5/0082

FOREIGN PATENT DOCUMENTS

| JP | 2011-249964 A | 12/2011 |
|---|---|---|
| WO | 2016/187066 A1 | 11/2016 |

OTHER PUBLICATIONS

Official Communication issued in International Patent Application No. PCT/JP2018/041839, dated Dec. 18, 2018.
(Continued)

*Primary Examiner* — Chuong A Ngo
(74) *Attorney, Agent, or Firm* — ScienBiziP, P.C.

(57) ABSTRACT

A terminal apparatus that communicates with a base station apparatus, the terminal apparatus including a receiver configured to receive an RRC reconfiguration message from the base station apparatus, a transmitter configured to transmit an RRC reconfiguration completion message in response to the RRC reconfiguration message to the base station apparatus, and a controller configured to generate the RRC reconfiguration completion message, wherein the RRC reconfiguration completion message is generated that includes information for identifying whether a measurement gap is necessary to measure a serving cell quality of a serving cell, based on first downlink bandwidth part (BWP)
(Continued)

information and no second downlink BWP information or one or more pieces of second downlink BWP information of the serving cell.

9 Claims, 10 Drawing Sheets

(51) Int. Cl.
*H04L 5/00* (2006.01)
*H04W 24/10* (2009.01)

(56) References Cited

OTHER PUBLICATIONS

NTT Docomo, "Revision of SI: Study on New Radio Access Technology", 3GPP TSG RAN Meeting #72, RP-161214, Jun. 13-16, 2016, 8 pages.
NTT Docomo, Inc., "Remaing issues on bandwidth parts for NR", 3GPP TSG RAN WG1 Meeting NR#3, R1-1716109, Sep. 18-21, 2017, pp. 1-5.
Vivo, "Consideration on measurement gap in NR", 3GPP TSG-RAN WG2 Meeting #99bis, R2-1710937, Oct. 9-13, 2017, 4 pages.
Intel Corporation, "Overall impact in RAN2 for BWP", 3GPP TSG RAN WG2 Meeting #99bis, R2-1710592, Oct. 9-13, 2017, pp. 1-8.

* cited by examiner

```
RRCReconfiguration-IEs ::= SEQUENCE {
    radioBearerConfig              RadioBearerConfig,
    masterCellGroupConfig          CellGroupConfig,
    secondaryCellGroupToAddModList SEQUENCE (SIZE (1..maxSCellGroups)) OF CellGroupConfig,
    secondaryCellGroupToReleaseList SEQUENCE (SIZE (1..maxSCellGroups)) OF CellGroup-Identity,
    measConfig                     MeasConfig,
    dedicatedNAS-MessageList       SEQUENCE (SIZE(1..maxDRB)) OF DedicatedNAS-Message,
    otherConfig                    OtherConfig,
    fullConfig                     ENUMERATED {true},
    ...
}
```

FIG. 8

```
RRCConnectionReconfigurationComplete ::= SEQUENCE {
    rrc-TransactionIdentifier       RRC-TransactionIdentifier,
    rlf-InfoAvailable               ENUMERATED {true},
    perCC-GapIndicationList         PerCC-GapIndicationList,
    bwp-GapIndicationList           Bwp-GapIndicationList
    ...
}
```

FIG. 10

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2017-219903 filed on Nov. 15, 2017, the contents of which are incorporated herein by reference.

BACKGROUND ART

A radio access method and a radio network for cellular mobile communications (which will hereinafter be referred to as "Long Term Evolution (LTE; trade name)" or "Evolved Universal Terrestrial Radio Access (EUTRA)") have been studied by the 3rd Generation Partnership Project (3GPP).

Furthermore, as a radio access method and a radio network technology for a 5th-generation cellular system, technical studies and standardization of LTE-Advanced Pro which is an enhanced technology of LTE and New Radio technology (NR) which is a new radio access technology have been conducted by the 3GPP (NPL 1).

CITATION LIST

Non Patent Literature

NPL 1: RP-161214, NTT DOCOMO, "Revision of SI: Study on New Radio Access Technology", June 2016

NPL 2: 3GPP R1-1716109 http://www.3gpp.org/ftp/tsg_ran/WG1_RL1/TSGR1_AH/NR_AH_1709/Docs/R1-1716109.zip NPL 3: 3GPP R2-1710937 http://www.3gpp.org/ftp/tsg_ran/WG2_RL2/TSGR2_99bis/Docs/R2-1710937.zip

SUMMARY OF INVENTION

Technical Problem

In NR, a part of a wide band of a serving cell is configured as Band Width Part (BWP) and one or multiple BWPs are configured in a terminal apparatus. Communication using a BWP has been studied, the BWP being switched among the multiple BWPs configured (NPL 2).

Since BWP is not taken into account in the existing LTE, in NR, in a case that a terminal apparatus measures a frequency other than an activated BWP and that a base station apparatus has no information indicating whether a gap for measurement is necessary, it is necessary to configure the gap for all the measurement, thus causing a problem in that communication between the base station apparatus and the terminal apparatus cannot efficiently be performed.

In NPL 3, a mechanism has been proposed that allows the terminal apparatus to notify the base station apparatus of whether a gap is necessary in measuring an intra-cell frequency other than an activated BWP for each frequency supported as a capability of the terminal apparatus.

However, in a case that a receivable frequency bandwidth and the like are different for each terminal apparatus, whether the gap is necessary cannot correctly be notified in accordance with a configuration of the BWP, thus causing a problem in that communication between the base station apparatus and the terminal apparatus cannot efficiently be performed.

In view of the circumstances described above, an object of an aspect of the present invention is to provide a terminal apparatus capable of efficiently communicating with a base station apparatus, a base station apparatus communicating with the terminal apparatus, a communication method used for the terminal apparatus, a communication method used for the base station apparatus, an integrated circuit mounted on the terminal apparatus, and an integrated circuit mounted on the base station apparatus.

Solution to Problem (1) In order to accomplish the object described above, an aspect of the present invention is contrived to provide the following measures. According to a first aspect of the present invention, there is provided a terminal apparatus that communicates with a base station apparatus, the terminal apparatus including: a receiver configured to receive an RRC reconfiguration message from the base station apparatus; a transmitter configured to transmit an RRC reconfiguration completion message in response to the RRC reconfiguration message to the base station apparatus; and a controller configured to generate the RRC reconfiguration completion message, wherein the RRC reconfiguration completion message is generated that includes information for identifying whether a measurement gap is necessary to measure a serving cell quality of a serving cell, based on first downlink bandwidth part (BWP) information and no second downlink BWP information or one or more pieces of second downlink BWP information of the serving cell.

(2) According to a second aspect of the present invention, there is provided a terminal apparatus that communicates with a base station apparatus, the terminal apparatus including: a transmitter configured to transmit a message for notifying capability of the terminal apparatus to the base station apparatus; and a controller configured to generate the message, wherein the message includes information of a first bandwidth for a frequency band for a combination of supported frequency bands, and the information of the first bandwidth indicates that the measurement gap is unnecessary in measuring a measurement object included in the first bandwidth including at least a downlink bandwidth part (BWP) to be activated in a case that the downlink BWP is used for communication.

(3) According to a third aspect of the present invention, there is provided a base station apparatus that communicates with a terminal apparatus, the base station apparatus including: a transmitter configured to transmit an RRC reconfiguration message to the terminal apparatus; a receiver configured to receive an RRC reconfiguration completion message in response to the RRC reconfiguration message from the terminal apparatus; and a controller configured to generate the RRC reconfiguration message, wherein the RRC reconfiguration message is generated that includes information for requesting information for identifying whether a measurement gap is necessary in measuring a serving cell quality of a serving cell based on a first downlink bandwidth part (BWP) information and no second downlink BWP information or one or more pieces of second downlink BWP information of the serving cell to be included in the RRC reconfiguration completion message.

(4) According to a fourth aspect of the present invention, there is provided a communication method applied to a terminal apparatus that communicates with a base station apparatus, the communication method including: receiving an RRC reconfiguration message from the base station apparatus; transmitting an RRC reconfiguration completion message in response to the RRC reconfiguration message to the base station apparatus; and generating the RRC reconfiguration completion message, wherein the RRC reconfiguration completion message is generated that includes information for identifying whether a measurement gap is necessary in measuring a serving cell quality of a serving cell, based on first downlink bandwidth part (BWP) information and no second downlink BWP information or one or more pieces of second downlink BWP information of the serving cell.

(5) According to a fifth aspect of the present invention, there is provided an integrated circuit implemented in a terminal apparatus that communicates with a base station apparatus, the integrated circuit causing the terminal apparatus to perform: receiving an RRC reconfiguration message from the base station apparatus; transmitting an RRC reconfiguration completion message in response to the RRC reconfiguration message to the base station apparatus; and generating the RRC reconfiguration completion message, wherein the RRC reconfiguration completion message is generated that includes information for identifying whether a measurement gap is necessary in measuring a serving cell quality of a serving cell, based on first downlink bandwidth part (BWP) information and no second downlink BWP information or one or more pieces of second downlink BWP information of the serving cell.

Advantageous Effects of Invention

According to an aspect of the present invention, the terminal apparatus and the base station apparatus can communicate efficiently.

BRIEF DESCRIPTION OF DRAWINGS

FIG. 8 is a diagram illustrating an example of an RRC reconfiguration message according to an embodiment of the present invention.

FIG. 10 is a diagram illustrating an example of elements included in an RRC reconfiguration completion message according to an embodiment of the present invention.

DESCRIPTION OF EMBODIMENTS

Embodiments of the present invention will be described below.

A radio communication system and a radio network according to the present embodiment will be described.

LTE (and LTE-A Pro) and NR may be defined as different RATs. The NR may be defined as a technology included in the LTE. The LTE may be defined as a technology included in the NR. Also, the LTE capable of connecting with the NR through dual connectivity may be distinguished from the existing LTE. The present embodiment may be applied to NR, LTE and other RATs. Terms associated with the LTE and the NR are used in the following description. However, the present invention may be applied to other technologies using other terms.

Figure 1:
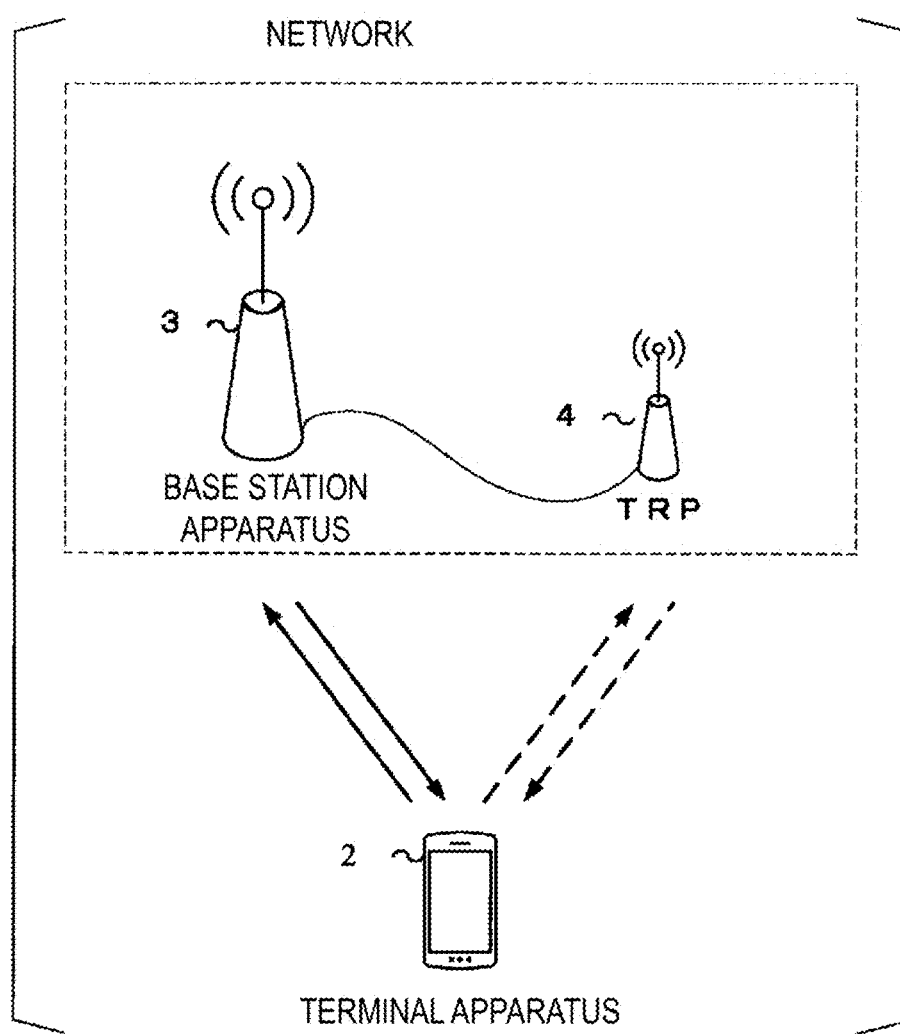
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 2 and a base station apparatus 3. Furthermore, the base station apparatus 3 may include one or more transmission reception points (TRPs) 4. The base station apparatus 3 may have a communicable range (communication area), controlled by the base station apparatus 3, that includes one or multiple cells to serve the terminal apparatus 2. The base station apparatus 3 may include a core network apparatus. Furthermore, the base station apparatus 3 may have a communicable range (communication area), controlled by one or multiple transmission reception points 4, that includes one or multiple cells to serve the terminal apparatus 2. In addition, one cell may be divided into multiple partial areas (also referred to as beamed areas or beamed cells), and the terminal apparatus 2 may be served in each of the partial areas. Here, a partial area may be identified based on a beam index used for beamforming, a quasi-colocation index, or a precoding index.

A communication area covered by the base station apparatus 3 may be different in size and shape for each frequency. In addition, a covered area may be different for each frequency. Furthermore, a radio network that allows cells having different types of base station apparatuses 3 and different cell radii to coexist at the same frequency or different frequencies and form one communication system is referred to as a heterogeneous network.

A radio communication link from the base station apparatus 3 to the terminal apparatus 2 is referred to as a downlink. A radio communication link from the terminal apparatus 2 to the base station apparatus 3 is referred to as an uplink. A direct radio communication link from the terminal apparatus 2 to another terminal apparatus 2 is referred to as a side link.

In radio communication between the terminal apparatus 2 and the base station apparatus 3 and/or radio communication between the terminal apparatus 2 and another terminal apparatus 2 illustrated in FIG. 1, Orthogonal Frequency Division Multiplexing (OFDM) including Cyclic Prefixes (CPs), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

In addition, in radio communication between the terminal apparatus 2 and the base station apparatus 3 and/or radio communication between the terminal apparatus 2 and another terminal apparatus 2 illustrated in FIG. 1, Universal-Filtered Multi-Carrier (UFMC), Filtered OFDM (F-OFDM), OFDM multiplied by a window function (Windowed OFDM), or Filter-Bank Multi-Carrier (FBMC) may be used.

Note that the present embodiment will be described by using OFDM symbol with the assumption that a transmission scheme is OFDM, but use of any other transmission scheme is also included in an aspect of the present invention. For example, an OFDM symbol according to this embodiment may be an SC-FDM symbol (it may be referred to also as a Single-Carrier Frequency Division Multiple Access (SC-FDMA) symbol).

In FIG. 1, the aforementioned transmission scheme that uses no CP or uses zero padding instead of the CP may be used for the radio communication between the terminal apparatus 2 and the base station apparatus 3 and/or the radio communication between the terminal apparatus 2 and the other terminal apparatus 2. Moreover, the CP or zero padding may be added both before and after the OFDM symbol.

The terminal apparatus 2 operates while considering the inside of a cell as a communication area. The terminal apparatus 2 may move to another appropriate cell through a cell re-selection procedure in a state in which no wireless connection is established (also referred to as an idle state or an RRC_IDLE state). The terminal apparatus 2 may move to another cell through a handover procedure in a state in which wireless connection is established (also referred to as a connected state or an RRC_CONNECTED state). Generally, the appropriate cell means that it is determined, based on information indicated from the base station apparatus 3, that access by the terminal apparatus 2 is not prohibited in the cell, and that the reception quality of a downlink satisfies a prescribed condition in the cell. The terminal apparatus 2 may move to another appropriate cell through a cell re-selection procedure in a non-active state (also referred to as an inactive state). The terminal apparatus 2 may move to another cell through a handover procedure in an inactive state.

In a case that the terminal apparatus 2 can communicate with a certain base station apparatus 3, a cell configured to be used for communication with the terminal apparatus 2 among cells of the base station apparatus 3 will be referred to as a serving cell, and the other cells not used for the communication may be referred to as neighboring cells. A part or all of system information required for a serving cell may be broadcast or notified to the terminal apparatus 2 in another cell.

According to the present embodiment, one or multiple serving cells are configured for the terminal apparatus 2. Multiple serving cells to be configured for the terminal apparatus 2 may include one primary cell and one or multiple secondary cells. The primary cell may be a serving cell in which an initial connection establishment procedure has been performed, a serving cell in which a connection re-establishment procedure has been initiated, or a cell indicated as the primary cell in a handover procedure. One or multiple secondary cells may be configured at a point of time when a Radio Resource Control (RRC) connection is established or after the RRC connection is established. In addition, a cell group (also referred to as a master cell group (MCG)) including one or multiple serving cells that include a primary cell (PCell) and one or multiple cell groups (also referred to as secondary cell groups (SCGs)) including one or multiple serving cells that do not include a primary cell and include a primary secondary cell (PSCell) that allows at least random access procedure to be performed and does not become into an inactive state may be configured for the terminal apparatus 2. The master cell group includes one primary cell and no secondary cell or one or more secondary cells. The secondary cell group includes one primary secondary cell and no secondary cell or one or more secondary cells. Either the MCG or the SCG may be a cell group including LTE cells.

Time Division Duplex (TDD) and/or Frequency Division Duplex (FDD) may be applied to the radio communication system according to the present embodiment. The Time Division Duplex (TDD) scheme or the Frequency Division Duplex (FDD) scheme may be applied to all of the multiple cells. Cells to which the TDD scheme is applied and cells to which the FDD scheme is applied may be aggregated.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described. Downlink physical channels and/or downlink physical signals may be collectively referred to as downlink signals. Uplink physical channels and/or uplink physical signals may be collectively referred to as uplink signals. Downlink physical channels and/or uplink physical channels may be collectively referred to as physical channels. Downlink physical signals and/or uplink physical signals may be collectively referred to as physical signals.

In downlink radio communication between the terminal apparatus 2 and the base station apparatus 3 illustrated in FIG. 1, the following downlink physical channels are used.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared Channel (PUSCH)
Physical Random Access CHannel (PRACH)

The PBCH is used for the base station apparatus 3 to broadcast an important information block (Master Information Block: MIB, Essential Information Block: EIB) including important system information (Essential information) required by the terminal apparatus 2. Here, one or multiple important information blocks may be transmitted as important information messages. For example, information indicating some or all of System Frame Numbers (SFN) (for example, information relating to a position within a super-frame composed of multiple frames) may be included in the important information block. For example, a radio frame (10 ms) may include 10 subframes of 1 ms, and the radio frame is identified using a frame number. The frame number returns to 0 after it becomes 1024 (Wrap around). In addition, in a case that a different important information block is transmitted for each area in a cell, information that can be used for identifying the area (for example, identifier information of a base station transmission beam configuring the area) may be included. For example, information necessary for connection to the cell and for mobility may be included in the important information. In addition, the important information message may be a part of a system information message. Some or all of the important information messages may be referred to as minimum system information (Minimum SI). In a case that all the valid minimum system information in a certain cell cannot be obtained, the terminal apparatus 2 may regard the cell as a cell to which access is prohibited (Barred Cell). In addition, only a part of the minimum system information may be broadcast in the PBCH, and the remaining minimum system information may be transmitted in the PDSCH to be described below.

The PBCH may be used for broadcasting a time index within a period of a block (also referred to as an SS/PBCH block or an SS block) including a synchronization signal described below. Here, the time index is information for indicating indexes of a synchronization signal and a PBCH in a cell. For example, in a case that an SS block is transmitted using three transmission beams, the time index may indicate a time sequence within a predetermined period or within a configured period. The terminal apparatus 2 may recognize a difference between time indexes as a difference between transmission beams.

The PDCCH is used for transmitting Downlink Control Information (DCI) in downlink radio communication (radio communication from the base station apparatus 3 to the terminal apparatus 2). Here, one or multiple pieces of DCI (which may be referred to as DCI formats) are defined for transmission of the downlink control information. In other words, a field for the downlink control information is defined as DCI and is mapped to information bits.

For example, information indicating a slot format may be indicated as DCI. For example, as the DCI, DCI may be defined that includes information for indicating a transmission period of a downlink that includes a PDCCH and/or a PDSCH, a gap, and a transmission period of an uplink that includes a PUCCH and/or a PUSCH, and SRS.

For example, as the DCI, DCI may be defined that includes information for indicating a transmission period of a scheduled PDSCH.

For example, as the DCI, DCI may be defined that includes information for indicating a transmission period of a scheduled PUSCH.

For example, as the DCI, DCI may be defined that includes information for indicating a timing at which an HARQ-ACK for the scheduled PDSCH is transmitted.

For example, as the DCI, DCI may be defined that includes information for indicating a timing at which an HARQ-ACK for the scheduled PUSCH is transmitted.

For example, as the DCI, DCI may be defined that is used for scheduling a radio communication DSCH of one downlink in one cell (transmission of one downlink transport block).

For example, as the DCI, DCI may be defined that is used for scheduling a radio communication PUSCH of one uplink in one cell (transmission of one uplink transport block).

Here, information relating to scheduling the PDSCH or the PUSCH is included in the DCI. Here, the DCI for the downlink is also referred to as downlink grant or downlink assignment. Here, the DCI for the uplink is also referred to as uplink grant or uplink assignment.

The PUCCH is used for transmitting Uplink Control Information (UCI) in uplink radio communication (radio communication from the terminal apparatus 2 to the base station apparatus 3). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate an HARQ-ACK for downlink data (Transport block, Medium Access Control Protocol Data Unit (MAC PDU), or Downlink-Shared CHannel (DL-SCH)).

The PDSCH is used for transmitting downlink data (Downlink Shared CHannel (DL-SCH)) from a Medium Access Control (MAC) layer. In addition, the PDSCH is also used for the transmission of system information (SI), a Random Access Response (RAR), and the like.

The PUSCH may be used for transmitting the HARQ-ACK and/or CSI together with uplink data (Uplink Shared CHannel (UL-SCH)) from the MAC layer or uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 2 exchange (transmit and/or receive) signals with each other in a higher layer. For example, the base station apparatus 3 and the terminal apparatus 2 may transmit and/or receive radio resource control (RRC) signaling (also referred to as radio resource control (RRC) message or radio resource control (RRC) information) in the RRC layer. The base station apparatus 3 and the terminal apparatus 2 may transmit and/or receive a Medium Access Control (MAC) control element in a MAC layer. Here, the RRC signaling and/or the MAC control element is also referred to as higher layer signaling. Here, the higher layer represents a higher layer than the physical layer and thus may include one or some of a MAC layer, an RRC layer, an RLC layer, a PDCP layer, a NAS layer, and the like. For example, in the processing of the MAC layer, the higher layer may include one or some of an RRC layer, an RLC layer, a PDCP layer, a NAS layer, and the like.

The PDSCH may be used for transmitting the RRC signaling and the MAC control element. Here, the RRC signaling transmitted from the base station apparatus 3 may be signaling common to multiple terminal apparatuses 2 in a cell. The RRC signaling transmitted from the base station apparatus 3 may be signaling dedicated to a certain terminal apparatus 2 (also referred to as dedicated signaling). In other words, terminal apparatus-specific (UE-specific) information may be transmitted through signaling dedicated to a certain terminal apparatus 2. The PUSCH may be used for transmitting the capability of the UE (UE Capability) in an uplink.

The PRACH may be used for transmitting a random access preamble. The PRACH is used for indicating the initial connection establishment procedure, the handover procedure, the connection re-establishment procedure, synchronization (timing adjustment) for uplink transmission, and a request for a PUSCH (UL-SCH) resource.

In FIG. 1, the following downlink physical signals are used for downlink radio communication. Here, the downlink physical signals are not used to transmit information output from the higher layers but are used by the physical layer.

Synchronization signal (SS)

Reference Signal (RS)

The synchronization signal is used for the terminal apparatus 2 to establish synchronization in a downlink in a frequency domain and a time domain. The synchronization signal may include a Primary Synchronization Signal (PSS) and a Secondary Synchronization Signal. In addition, the synchronization signal may be used for the terminal apparatus 2 to identify a cell identity (also referred to as a Cell Identifier (cell ID) or a Physical Cell Identifier (PCI)). Furthermore, the synchronization signal may be used for selecting/identifying/determining a base station transmission beam used by the base station apparatus 3 and/or a terminal reception beam used by the terminal apparatus 2 in downlink beamforming. In other words, the synchronization signal may be used to allow the terminal apparatus 2 to select/identify/determine the index of the base station transmission beam applied to the downlink signal by the base station apparatus 3. A beam may be referred to as a transmission or reception filter configuration. In addition, the synchronization signal may be used for measuring the quality of a cell. For example, a reception power (RSRP) or a reception quality (RSRQ) of the synchronization signal may be used for the measurement. In addition, the synchronization signal may be used for performing channel compensation for some of downlink physical channels.

A downlink reference signal (hereinafter, also simply referred to as a reference signal in this embodiment) may be classified into multiple reference signals based on purpose and the like. For example, one or multiple of the following reference signals may be used for the reference signal.

Demodulation Reference Signal (DMRS)
Channel State Information Reference Signal (CSI-RS)
Phrase Tracking Reference Signal (PTRS)
Tracking Reference Signal (TRS)

The DMRS may be used for channel compensation at the time of demodulating a received modulation signal. In the DMRS, two kinds of reference signals including a reference signal used for demodulating a PBCH and a reference signal used for demodulating a PDSCH may be defined, and both thereof may be referred to as DMRS. The CSI-RS may be used for measurement of Channel State Information (CSI) and beam management. The PTRS may be used for tracking the phase in the time axis for the purpose of ensuring a frequency offset due to phase noise. The TRS may be used to ensure a Doppler shift at the time of high-speed movement. In addition, the TRS may be used as one of the CSI-RS configurations. For example, a radio resource may be configured using the CSI-RS with one port as the TRS.

However, functions of at least some of the multiple reference signals described above may be supported by other reference signals.

In addition, at least one of the multiple reference signals described above or other reference signals may be defined as a cell-specific reference signal (CRS) individually configured for a cell, a beam-specific reference signal (BRS) for each transmission beam used by the base station apparatus 3 or the transmission reception point 4, and/or a terminal-specific reference signal (UE-specific reference signal (URS)) individually configured for terminal apparatuses 2.

In addition, at least one of reference signals may be used for a numerology such as a radio parameter or subcarrier spacing, or used for fine synchronization that allows FFT window synchronization.

In addition, at least one of reference signals may be used for measurement of radio resource management (RRM). Furthermore, at least one of reference signals may be used for beam management. Hereinafter, the measurement of radio resource management will be also simply referred to as measurement.

The BCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). The transport block is a unit of data that is delivered to the physical layer by the MAC layer. In the physical layer, the transport block is mapped to a codeword, and a coding processing is performed for each codeword.

The beam management may be a procedure by the base station apparatus 3 and/or the terminal apparatus 2 for matching directivity of an analog beam and/or a digital beam in a transmission apparatus (the base station apparatus 3 in a case of the downlink and the terminal apparatus 2 in a case of the uplink) with directivity of an analog beam and/or a digital beam in a reception apparatus (the terminal apparatus 2 in a case of the downlink and the base station apparatus 3 in a case of the uplink) to acquire a beam gain.

In addition, as a procedure of constructing, configuring, or establishing a beam pair link, the following procedures may be included.

Beam selection
Beam refinement
Beam recovery

For example, the beam selection may be a procedure of selecting a beam in communication between the base station apparatus 3 and the terminal apparatus 2. The beam refinement may be a procedure of selecting a beam having a higher gain or changing to an optimal beam between the base station apparatus 3 and the terminal apparatus 2 according to the movement of the terminal apparatus 2. The beam recovery may be a procedure of re-selecting a beam in a case that the quality of the communication link is degraded due to blockage caused by passage of a blocking object, a person, or the like in communication between the base station apparatus 3 and the terminal apparatus 2.

The beam selection and beam refinement may be included in the beam management. The following procedures may be included in the beam recovery.

Detection of beam failure
Discovery of new beam
Transmission of beam recovery request
Monitoring of response to beam recovery request For example, in a case that a beam is selected by the terminal apparatus 2, the CSI-RS or Reference Signal Received Power (RSRP) of SSS included in the SS/PBCH block may be used, or CSI may be used. The terminal apparatus 2 receives information indicating whether the CSI-RS or the SS/PBCH block is used for measuring cell quality from the base station apparatus 3 and measures the RSRP and/or RSRQ corresponding thereto. As information for the base station apparatus 3, a CSI-RS resource index (CRI) may be used, or a time index broadcast in a PBCH included in the SS/PBCH block may be used.

In a case of indicating a beam to the terminal apparatus 2, the base station apparatus 3 indicates the CRI or the time index of the SS/PBCH, and the terminal apparatus 2 receives the beam based on the CRI or the time index of the SS/PBCH that has been indicated. At this time, the terminal apparatus 2 may receive the beam by configuring a spatial filter based on the CRI or the time index of the SS/PBCH that has been indicated. The terminal apparatus 2 may receive the beam by using a Quasi-Co-Location (QLC) assumption. A certain signal (an antenna port, a synchronization signal, a reference signal, or the like) being in QCL or being assumed to be in QCL with another signal (an antenna port, a synchronization signal, a reference signal, or the like) can be interpreted as the certain signal being associated with the other signal.

In a case that long term properties of a channel on which one symbol in one antenna port is carried may be estimated from a channel on which one symbol in another antenna port is carried, the two antenna ports are said to be in QCL. The long term properties of the channel include one or some of a delay spread, a Doppler spread, a Doppler shift, an average gain, or an average delay. For example, in a case that an antenna port 1 and an antenna port 2 are in QCL with respect to the average delay, this means that a reception timing for the antenna port 2 may be inferred from a reception timing for the antenna port 1.

The QCL may also be extended to beam management. For this purpose, spatial QCL extended may be newly defined. For example, long term properties of a channel in a spatial QCL assumption may be an arrival angle (an Angle of Arrival (AoA), a Zenith angle of Arrival (ZoA), or the like) and/or an angle spread (for example, an Angle Spread of Arrival (ASA) or a Zenith angle Spread of Arrival (ZSA)), an angle of departure (an AoD, a ZoD, or the like) and an angle spread thereof (for example, an Angle Spread of Departure (ASD), a Zenith angle Spread of Departure (ZSS)), a spatial correlation, and a reception spatial parameter in a radio link or channel.

For example, in a case that an antenna port 1 and an antenna port 2 can be considered to be in QCL with respect to a reception spatial parameter, it means that a reception beam for receiving a signal from the antenna port 2 can be inferred from a reception beam (a spatial filter) for receiving a signal from the antenna port 1.

With this method, operations of the base station apparatus 3 and the terminal apparatus 2 for the beam management and beam indication/report may be defined that are equivalent to operations for the beam management by using spatial QCL assumption and radio resources (time and/or frequency).

A radio protocol structure according to the present embodiment will be described.

In this embodiment, a protocol stack for handling user data of the terminal apparatus 2 and the base station apparatus 3 will be referred to as a User-plane (UP; U-Plane) protocol stack, and a protocol stack for handling control data will be referred to as a Control-plane (CP; C-Plane) protocol stack.

The physical layer (PHY layer) uses the physical channels to provide a transmission service to a higher layer. The PHY layer is connected with a Medium Access Control layer (MAC layer), which is a higher layer, via the transport channels. Data is moved between layers, in other words, the MAC layer and the PHY layer through the transport channel. The data is transmitted and/or received between the PHY layers of the terminal apparatus 2 and the base station apparatus 3 through a physical channel.

The MAC layer maps various logical channels to various transport channels. The MAC layer is connected to a Radio Link Control layer (RLC layer), which is a higher layer, via the logical channels. The logical channels are roughly classified depending on the type of information to be transmitted, specifically, classified into control channels for transmitting control information and traffic channels for transmitting user information. The MAC layer has a function of controlling the PHY layer for intermittent reception/transmission (DRX·DTX), a function of performing a random access procedure, a function of notifying information of transmit power, a function of performing HARQ control, and the like.

The RLC layer performs segmentation of data received from a higher layer to adjust a size of the data so that a lower layer can appropriately transmit the data. The RLC layer also has a function of ensuring Quality of Service (QoS) required for each data. In other words, the RLC layer has a function of data re-transmission control or the like.

A Packet Data Convergence Protocol layer (PDCP layer) may have a header compression function of compressing unnecessary control information to efficiently transmit an IP packet, which is user data, in a radio section. In addition, the PDCP layer may also have a data encryption function.

The Service Data Adaptation Protocol layer (SDAP layer) may have a function of mapping QoS of downlink data transmitted from a core network to the terminal apparatus 2 through the base station apparatus 3 and QoS of uplink data associated with the downlink data, and mapping them into a DRB described below.

In addition, there is a Radio Resource Control layer (RRC layer) in the control plane protocol stack. The RRC layer performs configuration and reconfiguration of a Radio Bearers (RB) to control the logical channel, the transport channel, and the physical channel. The RB may be classified into a Signaling Radio Bearer (SRB) and a Data Radio Bearer (DRB), and the SRB may be used as a path for transmitting an RRC message which is control information. The DRB may be used as a path for transmitting the user data. The RBs may be configured between the RRC layers of the base station apparatus 3 and the terminal apparatus 2.

The SRB is defined as a radio bearer that is used for transmitting an RRC message and a NAS message. In addition, as SRBs, an SRB (SRB0) for the RRC message using a CCCH logical channel, an SRB (SRB1) for the RRC message using a DCCH logical channel and a NAS message to be transmitted before the establishment of SRB2, and an SRB (SRB2) for a NAS message using a DCCH logical channel and the RRC message including logged measurement information and the like may be defined. In addition, other SRBs may be defined.

An MCG SRB is transmitted using the SRB of the MCG. Although an MCG Split SRB is transmitted using the SRB of the MCG or the SCG, the PDCP resides on the MCG side, and thus the MCG Split SRB will be described as the MCG SRB in this specification. In other words, the "MCG SRB" may be replaced with the "MCG SRB and/or the MCG Split SRB". The SCG SRB is transmitted using the SRB of the SCG. Although the SCG Split SRB is transmitted using the SRB of the MCG or the SCG, the PDCP resides on the SCG side, and thus the SCG Split SRB is described as the SCG SRB in this specification. In other words, the "SCG SRB" may be replaced with "SCG SRB and/or SCG Split SRB".

In addition, SRB0, SRB1, and SRB2 may be prepared in the MCG SRB. Furthermore, SRB3 having a function that is equivalent to that of SRB1 may be prepared in the SCG SRB. An SRB having a function that is equivalent to that of SRB0 and/or SRB2 may not be prepared in the SCG SRB.

In addition, the MCG SRB may be configured to allow an NAS message and an RRC message to be sent, and the SCG SRB may be configured to allow an RRC message to be sent. The SCG SRB may be configured not to allow a NAS message to be sent.

The MCG DRB is transmitted using the DRB of the MCG. Although the MCG Split DRB is transmitted using the DRB of the MCG or the SCG, the PDCP resides on the MCG side, and thus the MCG Split DRB will be described as the MCG DRB in this specification. In other words, the "MCG DRB" may be replaced with the "MCG DRB and/or the MCG Split DRB". The SCG DRB is transmitted using the DRB of the SCG. Although the SCG Split DRB is transmitted using the DRB of the MCG or the SCG, the PDCP resides on the SCG side, and the SCG Split DRB will be described as the SCG DRB in this specification. In other words, the "SCG DRB" may be replaced with "the SCG DRB and/or the SCG Split DRB".

The PHY layer corresponds to a physical layer, which is a first layer in a hierarchical structure of a generally-known Open Systems Interconnection (OSI) model, the MAC layer, the RLC layer, and the PDCP layer correspond to a data link layer, which is a second layer of the OSI model, and the RRC layer corresponds to a network layer that is a third layer of the OSI model.

The functional classification of the MAC layer, the RLC layer, and the PDCP layer described above is an example, and some or all of the functions may not be implemented. Some or all of the functions of each layer may be included in another layer. For example, control elements of the MAC layer and RRC signaling are signaling of higher layer than the physical layer. For example, RRC signaling is signaling of higher layer than the MAC layer. The MAC layer and the physical layer are lower layers than the RRC layer. For example, the NAS layer is also referred to as an upper layer than the RRC layer.

A signaling protocol used between the network and the terminal apparatus 2 is classified into an Access Stratum (AS) protocol and a Non-Access Stratum (NAS) protocol. For example, a protocol in the RRC layer or in a lower layer is the Access Stratum protocol used between the terminal apparatus 2 and the base station apparatus 3. Further, a protocol such as Connection Management (CM) and Mobility Management (MM) of the terminal apparatus 2 is the Non-Access Stratum protocol, and is used between the terminal apparatus 2 and a core network (CN). For example, between the terminal apparatus 2 and a Mobility Management Entity (MME), communication using the Non-Access Stratum protocol is transparently performed via the base station apparatus 3.

Hereinafter, a subframe will be described. In this embodiment, although the term "subframe" is used, it may be also referred to as a resource unit, a radio frame, a time section, a time interval, or the like. In addition, one or multiple subframes may constitute one radio frame.

Figure 4:
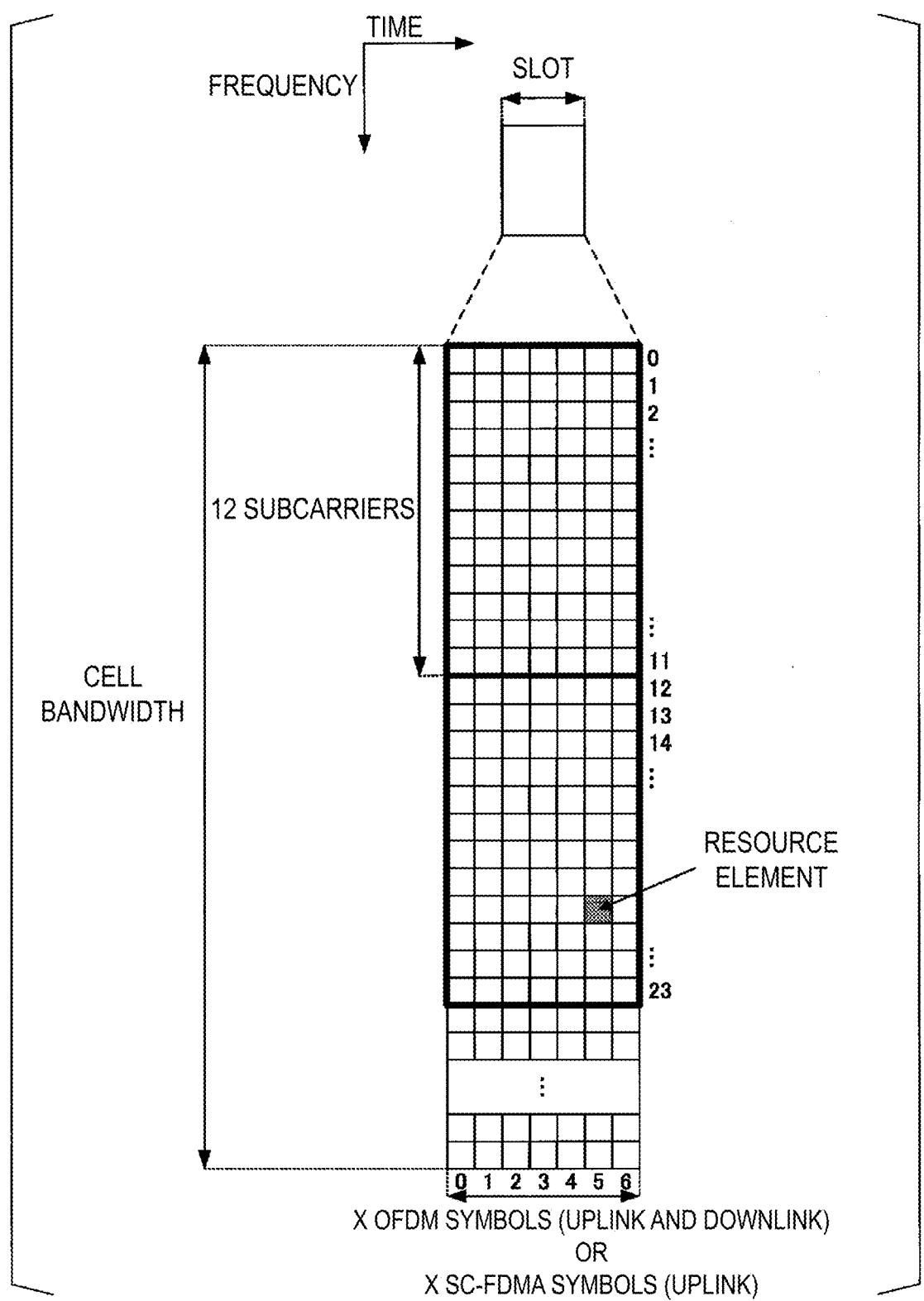
FIG. 4 is a diagram schematically illustrating an example configuration of a downlink slot according to an embodiment of the present invention.

FIG. 4 is a diagram schematically illustrating an example configuration of a downlink slot according to an embodiment of the present invention. Each of the radio frames has a length of 10 ms. Each of the radio frames includes 10 subframes and X slots. In other words, the length of one subframe is 1 ms. For each of the slots, time length is defined based on a subcarrier spacing. For example, in a case that the subcarrier spacing of an OFDM symbol is 15 kHz with Normal Cyclic Prefix (NCP), X=7 or X=14, which correspond to 0.5 ms and 1 ms, respectively. In addition, in a case that the subcarrier spacing is 60 kHz, X=7 or X=14, which correspond to 0.125 ms and 0.25 ms, respectively. FIG. 4 illustrates the downlink slot configuration in a case of X=7 as an example. Note that the downlink slot configuration can be similarly expanded to a downlink slot configuration in a case of X=14. Furthermore, the uplink slot is defined similarly, and the downlink slot and the uplink slot may be defined separately. The bandwidth of a cell illustrated in FIG. 4 may be also defined as a part (Band Width Part (BWP)) of the band. Alternatively, the BWP may be defined as a part of the bandwidth of the cell. A slot may be defined as a Transmission Time Interval (TTI). The slot may not be defined as a TTI. The TTI may be a transmission period of a transport block.

The signal or the physical channel transmitted in each of the slots may be represented by a resource grid. The resource grid is defined by multiple subcarriers and multiple OFDM symbols. The number of subcarriers constituting one slot depends on each of the downlink and uplink bandwidths of a cell. Each element within the resource grid is referred to as a resource element. The resource element may be identified by using a subcarrier number and an OFDM symbol number.

A resource block is used to represent mapping of a certain physical downlink channel (such as the PDSCH) or a certain physical uplink channel (such as the PUSCH) to resource elements. As the resource block, a virtual resource block and a physical resource block are defined. The certain physical uplink channel is first mapped to the virtual resource block. Thereafter, the virtual resource block is mapped to the physical resource block. In a case that the number X of OFDM symbols included in a slot is 7 with NCP, one physical resource block is defined by 7 consecutive OFDM symbols in the time domain and by 12 consecutive subcarriers in the frequency domain. Hence, one physical resource block includes (7×12) resource elements. In a case of Extended CP (ECP), one physical resource block is defined by 6 consecutive OFDM symbols in the time domain and by 12 consecutive subcarriers in the frequency domain. Hence, one physical resource block includes (6×12) resource elements. In this case, one physical resource block corresponds to one slot in the time domain and corresponds to 180 kHz in a case of a subcarrier spacing of 15 kHz (720 kHz in a case of 60 kHz) in the frequency domain. Physical resource blocks are numbered from 0 in the frequency domain.

A subcarrier spacing configuration $\mu$ will be described. In NR, multiple OFDM Numerologies are supported. In a certain BWP, a subcarrier spacing configuration $\mu$ ($\mu$=0, 1, . . . , 5) and a cyclic prefix length are given in a higher layer for a downlink BWP and is given in a higher layer for an uplink BWP. Here, $\mu$ is given and the subcarrier spacing $\Delta f$ is given as $\Delta f = 2^\mu \# 15$ (kHz).

In the subcarrier spacing configuration $\mu$, slots are counted in an ascending order from 0 to $N^{\{subframe, \mu\}}\_\{slot\}-1$ within a subframe and are counted in an ascending order from 0 to $N^{\{frame, \mu\}}\_\{slot\}-1$ within a frame. $N^{\{slot\}}\_\{symb\}$ consecutive OFDM symbols are present within a slot based on the slot configuration and cyclic prefixes. $N^{\{slot\}}\_\{symb\}$ is 7 or 14. The start of the slot $n^{\{\mu\}}\_\{s\}$ within a subframe is aligned in time with the start of an $n^{\{\mu\}}\_\{s\}N^{\{slot\}}\_\{symb\}$-th OFDM symbol within the same subframe.

Figure 3:
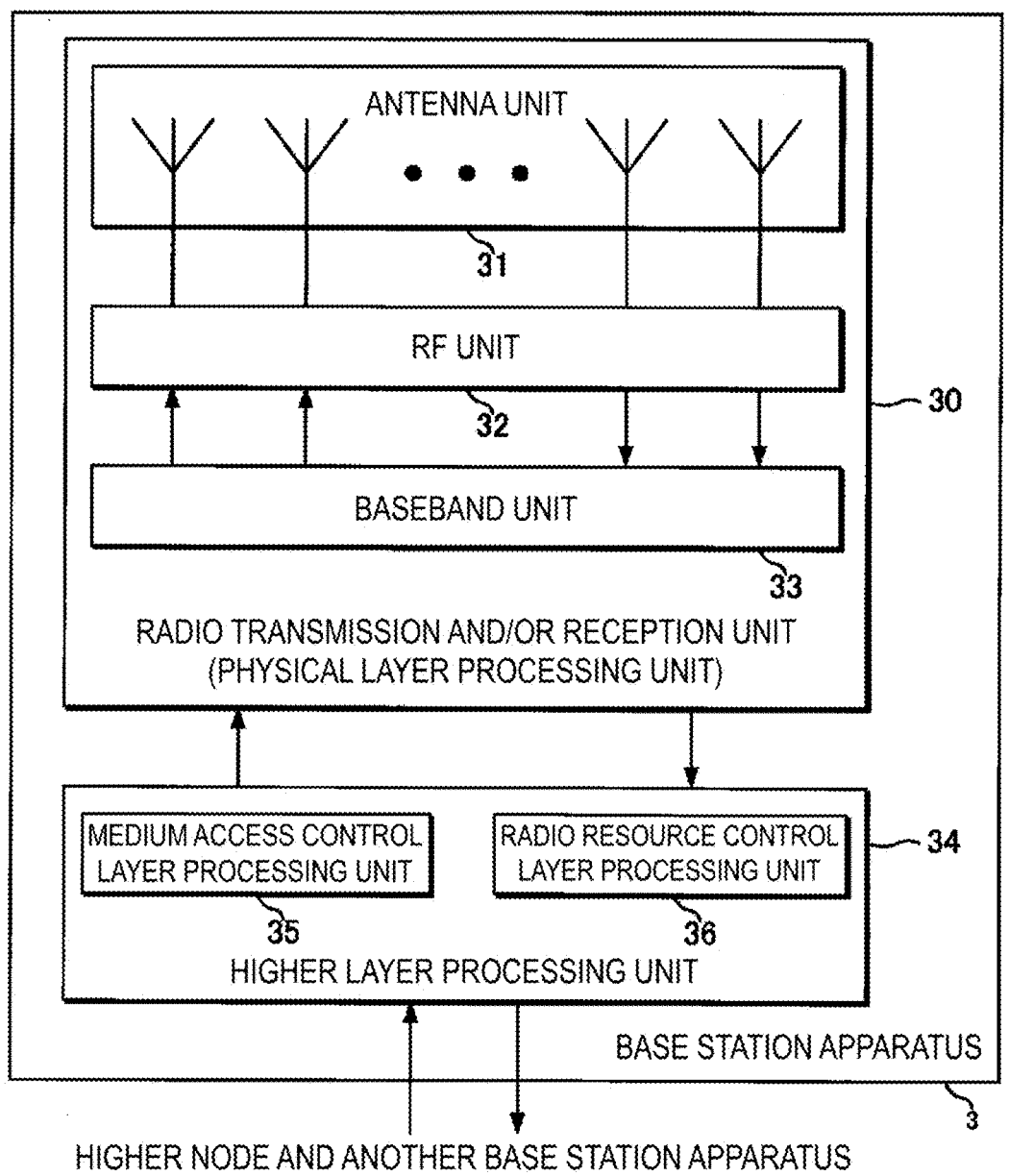
FIG. 3 is a block diagram schematically illustrating an example configuration of a base station apparatus according to the embodiment of the present invention.
Figure 5:
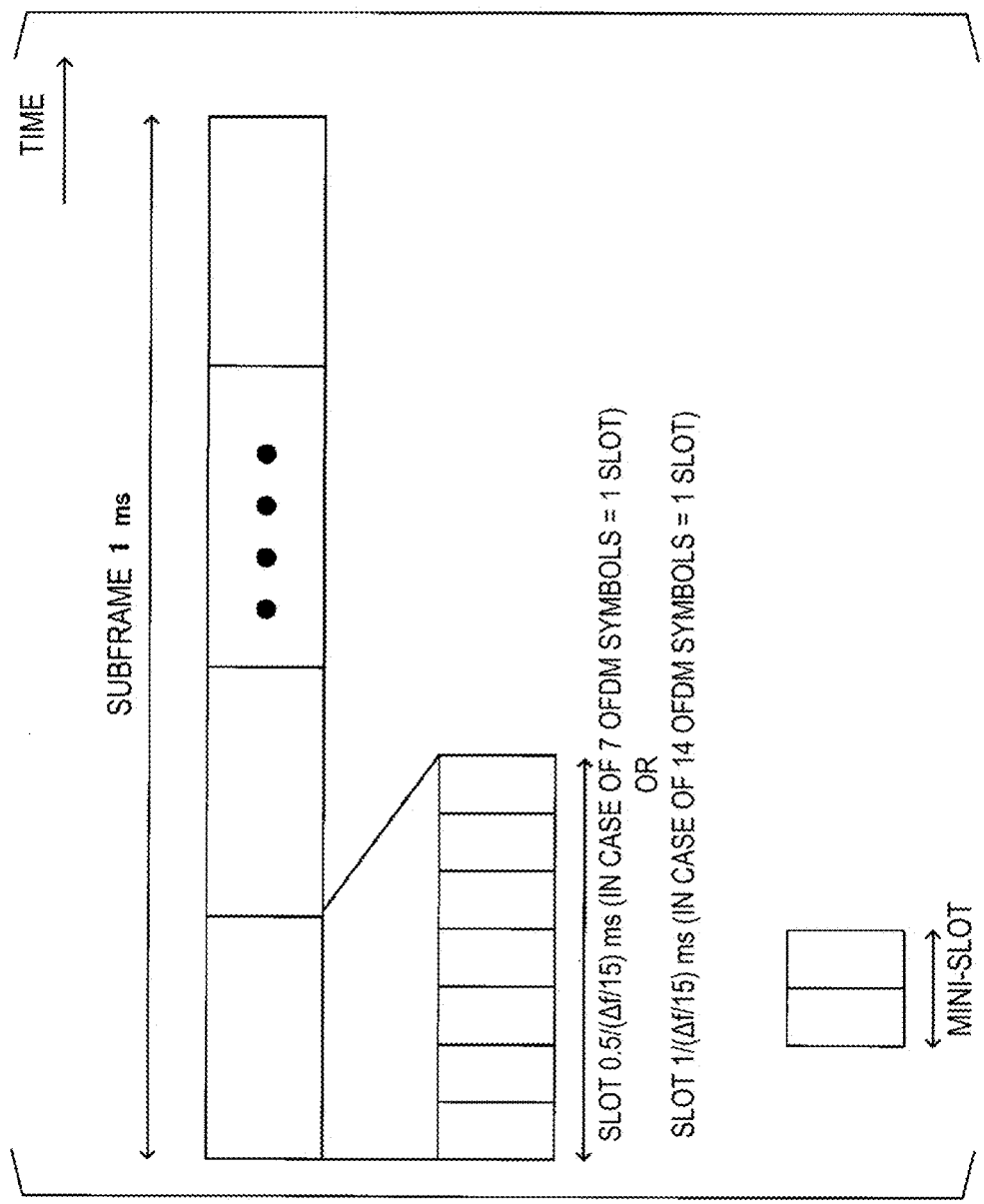
FIG. 5 is a diagram illustrating the relationships between a subframe, a slot, and a mini-slot in a time domain according to an embodiment of the present invention.

Next, a subframe, a slot, and a mini-slot will now be described. FIG. 5 is a diagram illustrating the relationships between the subframe, the slot, and the mini-slot in a time domain. As illustrated in FIG. 3, three types of time units are defined. The subframe is 1 ms regardless of a subcarrier spacing, the number of OFDM symbols included in the slot is 7 or 14, and a slot length differs depending on the subcarrier spacing. Here, in a case that the subcarrier spacing is 15 kHz, 14 OFDM symbols are included in one subframe.

The mini-slot (which may be referred to as a sub-slot) is a time unit including OFDM symbols that are fewer in number than the OFDM symbols included in the slot. FIG. 3 illustrates, by way of example, a case in which the mini-slot includes 2 OFDM symbols. The timing for the OFDM symbols in the mini-slot may coincide with the timing for the OFDM symbols constituting the slot. A minimum unit of scheduling may be a slot or a mini-slot. Allocation of the mini-slot may be referred to as non-slot based scheduling. The scheduling of the mini-slot may be represented as a resource of which a relative time position between a reference signal and a start position of data is fixed is scheduled.

Figure 6:
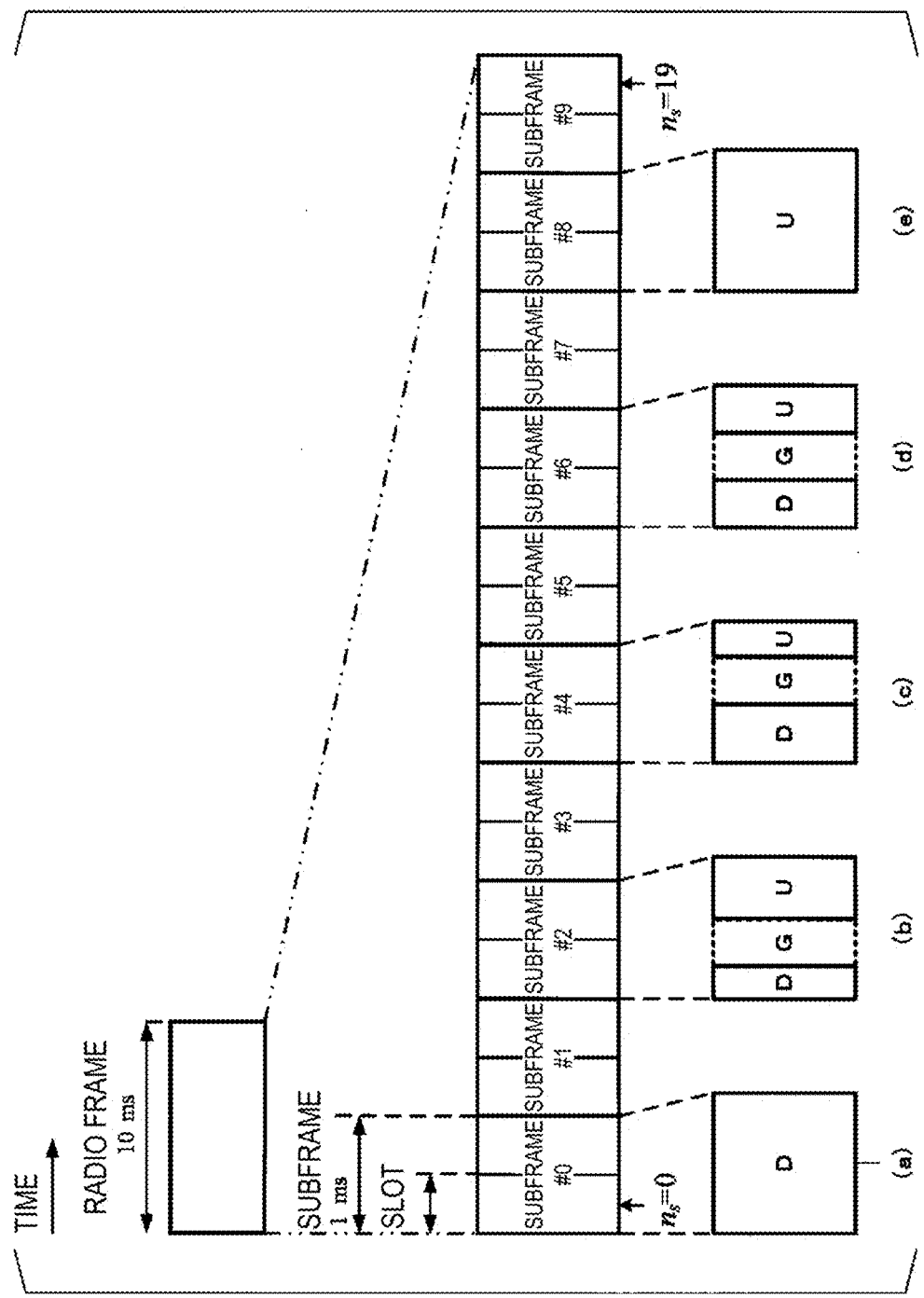
FIG. 6 is a diagram illustrating an example of slots or subframes according to an embodiment of the present invention.

FIG. 6 is a diagram illustrating an example of slots or subframes (subframe type). Here, a case in which the slot length is 0.5 ms with a subcarrier spacing of 15 kHz is illustrated as an example. In FIG. 6, D represents the downlink, and U represents the uplink. As illustrated in FIG. 6, within a certain time section (for example, a minimum time section that should be allocated to one UE in a system), one or some of the following elements may be included.

a downlink part (duration)

a gap an uplink part (duration)

Such a ratio may be predetermined as a slot format. In addition, the ratio may be defined using the number of OFDM symbols of a downlink included within a slot or a start position and an end position within a slot. Furthermore, the ratio may be defined using the number of OFDM symbols or DFT-S-OFDM symbols of an uplink included within a slot or a start position and an end position within a slot. The scheduling of slots may be represented as the scheduling of a resource of which a relative time position between a reference signal and a slot boundary is fixed.

FIG. 6(a) is an example in which, in a certain time section (for example, it may be referred to as a minimum unit of a time resource that can be allocated to one UE, a time unit, or the like. In addition, multiple minimum units of the time resource may be collectively referred to as a time unit), the entire subframe is used for downlink transmission. FIG. 6(b) is an example in which scheduling of an uplink is performed, for example, through a PDCCH in a first time resource, and an uplink signal is transmitted after a gap for a processing delay of the PDCCH, a time for switching from a downlink to an uplink, and generation of a transmit signal. FIG. 6(c) is an example in which the subframe is used for transmitting a PDCCH and/or a PDSCH in a first time resource and is used for transmitting a PUSCH or a PUCCH after a gap for a processing delay, a time for switching from a downlink to an uplink, and generation of a transmit signal. Here, for example, the uplink signal may be used to transmit the HARQ-ACK and/or the CSI, namely, the UCI. FIG. 6(d) is an example in which the subframe is used for transmitting a PDCCH and/or a PDSCH in a first time resource and is used for transmitting a PUSCH and/or a PUCCH after a gap for a processing delay, a time for switching from a downlink to an uplink, and generation of a transmit signal. Here, as an example, the uplink signal may be used to transmit the uplink data, namely, the UL-SCH. FIG. 6(e) is an example in which the entire subframe is used for uplink transmission (PUSCH or PUCCH).

The downlink part and the uplink part described above, similar to LTE, may include multiple OFDM symbols.

Figure 7:
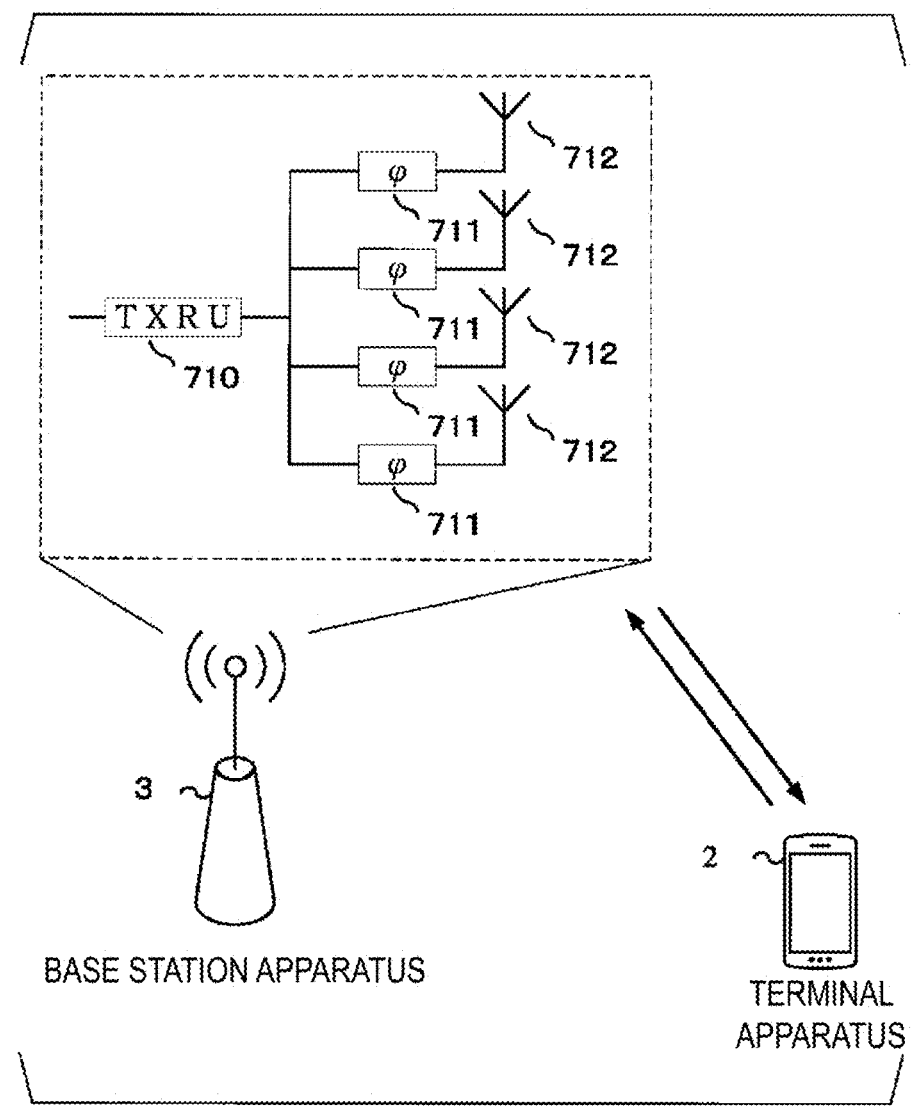
FIG. 7 is a diagram illustrating an example of beamforming according to an embodiment of the present invention.

FIG. 7 is a diagram illustrating an example of beamforming. Multiple antenna elements are connected to one transmission unit (Transceiver unit (TXRU)) 710, a phase is controlled by a phase shifter 11 of each antenna element, and a transmit signal is transmitted from the antenna element 712, allowing a beam for the transmit signal to be directed in a predetermined direction. Typically, the TXRU may be defined as an antenna port, and only the antenna port may be defined in the terminal apparatus 2. The directivity can be directed in a predetermined direction by controlling the phase shifters 711, thus allowing the base station apparatus 3 to communicate with the terminal apparatus 2 using a high gain beam.

A Band Width Part (BWP) will be described.

The BWP may be a part of or an entire band of a serving cell. The BWP may be also referred to as a carrier BWP. One or multiple BWPs may be configured for the terminal apparatus 2. A certain BWP may be configured using information included in broadcast information associated with a synchronization signal detected through an initial cell search. In addition, a certain BWP may be a frequency bandwidth associated with a frequency at which the initial cell search is to be performed. A certain BWP may be configured through RRC signaling (for example, Dedicated RRC signaling). A downlink BWP (DL BWP) and an uplink BWP (UL BWP) may be individually configured. In addition, one or multiple uplink BWPs may be mapped with one or multiple downlink BWPs. In addition, the mapping between the uplink BWPs and the downlink BWPs may be predefined mapping, mapping by RRC signaling (for example, Dedicated RRC signaling), mapping by physical layer signaling (for example, downlink control information (DCI) notified in a downlink control channel), or a combination thereof.

A BWP may include a group of continuous physical radio blocks (Physical Resource Blocks (PRBs)). Parameters of BWP (one or multiple BWPs) of each component carrier may be configured for the terminal apparatus 2 in a connected state. The parameters of the BWP of each component carrier may include some or all of (A) Type of cyclic prefix, (B) Subcarrier spacing, (C) Frequency position of BWP (for example, a start position of a low frequency side or a central frequency position of the BWP) (here, as the frequency position, for example, an ARFCN may be used, or an offset from a specific subcarrier of a serving cell may be used. In addition, a unit of the offset may be a unit of the subcarrier or a unit of a resource block. Furthermore, both the ARFCN and the offset may be configured), (D) Bandwidth of BWP (for example, the number of PRBs), (E) Resource configuration information of control signal, and (F) Central frequency position of SS block (here, as the frequency position, for example, an ARFCN may be used, or an offset from a specific subcarrier of a serving cell may be used. In addition, a unit of the offset may be a unit of the subcarrier or a unit of the resource block. Furthermore, both the ARFCN and the offset may be configured). In addition, the resource configuration information of the control signal may be included in configurations of BWPs of some or all of at least a primary cell and/or a primary secondary cell.

The terminal apparatus 2 may perform transmission and/or reception in an active BWP (A-BWP) among one or multiple configured BWPs. In addition, for the terminal apparatus 2, one maximum uplink BWP and one maximum downlink BWP among one or multiple BWPs configured for one serving cell may be configured to be A-BWPs at a certain time.

The BWP that is configured to be specific to a cell may be referred to as an initial BWP (I-BWP). The I-BWP may be a BWP configured by the BWP that is configured in accordance with a BWP configuration included in ServingCell-ConfigCommon. The SS block and/or the CSI-RS of the I-BWP may be defined as an SS block and/or a CSI-RS for cell definition. The SS block and/or the CSI-RS for cell definition may be used as the time reference of the serving cell. In addition, the SS block and/or the CSI-RS for cell definition may be used for the measurement of the serving cell based on the SS block and/or the CSI-RS. The I-BWP and/or a default BWP (D-BWP) described below may be configured (or reconfigured) using RRC signaling (for example, an RRC reconfiguration message or the like). The I-BWP may be configured or changed in accordance with information included in a synchronous reconfiguration information element (synchronousReconfiguration Information Element) of the RRC reconfiguration message. ServingCellConfigCommon may be included in the synchronous reconfiguration information element. The default BWP (D-BWP) may be configured or changed in accordance with information included in an information element other than the synchronous reconfiguration information element of the RRC reconfiguration message. Information included in the information element other than the synchronous reconfiguration information element may include ServingCellConfigDedicated. The I-BWP may be a BWP that is configured in accordance with a default BWP configuration included in ServingCellConfigDedicated. A configuration of one or multiple BWPs may be included in ServingCellConfigDedicated. The terminal apparatus 2 for which multiple BWPs including the D-BWP are configured may perform communication with the multiple BWPs switched. For example, transmission and/or reception is performed by causing the A-BWP to switch from another BWP to the D-BWP through control using a certain timer. In other words, in a case that the timer expires, transmission and/or reception may be performed by causing the A-BWP to switch back to the D-BWP. The timer described above may also be used as a timer of Discontinued RX (DRX). For example, in a case that an inactive timer of the DRX expires (in the case of a transition from an active state to an inactive state), control may be performed so as to cause the A-BWP to switch back to the D-BWP. A timer that is independent from the timer of the DRX may be used. For example, by using a timer that is triggered by switching of the BWP and started, the A-BWP may be configured so as to return (switch) to the D-BWP in a case that the timer expires.

The I-BWP and the D-BWP may be configured to be the same. In addition, the I-BWP and the D-BWP may be configured to be different from each other. The terminal apparatus 2 for which the D-BWP is not configured may consider the I-BWP to be the D-BWP.

The switching of the A-BWP (activation and/or deactivation of the BWP) may be notified from the base station apparatus 3 to the terminal apparatus 2 through (A) RRC signaling and/or (B) physical layer signaling (for example, DCI).

The SS block will be described. The SS block may include 4 OFDM symbols numbered from 0 to 3 in the time domain. The SS block may include 24 consecutive resource blocks in the frequency domain. The SS block may include consecutive subcarriers numbered from 0 to 287 sequentially from the low frequency side in the frequency domain. The terminal apparatus 2 may be assumed such that a sequence of symbols constituting a primary synchronization signal (PSS) is mapped to the resource elements of the SS block with power scaled using a coefficient (factor) $\beta ss$. In addition, the terminal apparatus 2 may be assumed such that a sequence of symbols constituting a secondary synchronization signal (SSS) is mapped to the resource elements of the SS block with power scaled using a coefficient (factor) $\beta ss$. The terminal apparatus 2 may be assumed such that a sequence of complex symbols constituting a PBCH is mapped to the resource elements of the SS block with power scaled using a coefficient (factor) $\beta PBCH$. The terminal apparatus 2 may be assumed such that a sequence of complex symbols constituting a demodulation reference signal for an SS block is mapped to the resource elements of the SS block with power scaled using a coefficient (factor) $\beta PBCH\char`\^ DMRS$. The SS block includes one PSS, one SSS, and one PBCH. One PSS, one SSS, and one PBCH within the same SS block may be mapped to consecutive OFDM symbols.

The coefficient (factor) used for scaling the power of the SS block may be broadcast and/or notified from the base station apparatus 3. In addition, the coefficient (factor) may be configured to be independent for each BWP.

Radio link monitoring (RLM) will be described.

An example of the operation of the RRC-connected terminal apparatus 2 detecting a radio link failure will be described.

The terminal apparatus 2 acquires information of a value (t310) of a timer (T310) used for detecting physical layer problems of the serving cell, a threshold N310 of the number of times of detection of out-of-sync (OoS), a threshold N311 of the number of times of detection of in-sync (IS), and the like from the serving base station apparatus 3 using broadcast information and RRC messages for individual users. In addition, the value and the threshold of the number of times of the timer described above may be configured to be default values.

In order to perform radio link monitoring, at a time when the radio link quality of the serving cell is estimated to be worse than a specific threshold Qout over a specific period (for example, TEvaluate_Qout=200 ms) based on information of a reception power of a received reference signal (for example, an RLM-RS) and the like, the physical layer processing unit of the terminal apparatus 2 notifies "out-of-sync" to a radio resource control (RRC) layer processing unit, which is a higher layer. In addition, at a time when the radio link quality of the serving cell is estimated to exceed a specific threshold Qin over a specific period (for example, TEvaluate_Qin=100 ms) based on the information of a reception power of a received reference signal and the like, the physical layer processing unit notifies "in-sync" to a radio resource control layer processing unit, which is a higher layer. The physical layer processing unit may perform a notification to the higher layer in an out-of-sync or in-sync state at an interval that is equal to or longer than a specific interval (for example, TReport_sync=10 ms).

The terminal apparatus 2 may be notified of some or all of the following information (A) to (D) using an RRC message or any other signaling from the base station apparatus 3.

(A) Resource information of the RLM-RS of the D-BWP (B) Information of a value and a threshold (for example, the thresholds N310 and N311) of the number of times of a timer (for example, the timer T310) used in the D-BWP (C) Resource information of the RLM-RS of the serving cell (for example, a PCell and/or a PSCell)

(D) Information of a value and a threshold of the number of times (for example, the thresholds N310 and N311) of a timer (for example, the timer T310) used in the serving cell (for example, a PCell and/or a PSCell)

(E) Resource information of the RLM-RS of the I-BWP (F) Information of the value and a threshold of the number of times (for example, the thresholds N310 and N311) of a timer (for example, the timer T310) used in the I-BWP Here, for example, the threshold Qout may be defined as a level at which a downlink radio link cannot be reliably received, and a block error rate of transmission of a hypothetical downlink control channel PDCCH based on a predetermined parameter becomes 10%. For example, the threshold Qin may be defined as a level at which the radio link quality of a downlink is significantly reliable more than in the Qout state, and the block error rate of transmission of a hypothetical downlink control channel based on the predetermined parameter becomes 2%. In addition, multiple block error rates (levels of the threshold Qout and the threshold Qin) may be defined based on a frequency and subcarrier spacing that are used, the type of service, and the like.

In a case that the A-BWP is different from the D-BWP in a serving cell (for example, the PCell and/or the PSCell), the terminal apparatus 2 may monitor radio links by using the RLM-RS of the D-BWP. In a case that the A-BWP is different from the I-BWP, the terminal apparatus 2 may monitor radio links by using the RLM-RS of the I-BWP. In addition, the RLM-RS may be configured for each BWP in a serving cell (for example, the PCell and/or the PSCell), and the terminal apparatus 2 may monitor radio links by using the RLM-RS of the A-BWP. In addition, an RLM-RS not depending on the BWP may be configured in a serving cell (for example, the PCell and/or the PSCell), and the terminal apparatus 2 may monitor radio links by using the RLM-RS. The physical layer processing unit of the terminal apparatus 2 may notify a higher layer of only out-of-sync and in-sync occurring in a case that the A-BWP is the D-BWP in a serving cell (for example, the PCell and/or the PSCell) or may notify a higher layer of only out-of-sync and in-sync occurring in the A-BWP. In addition, in a case that, in a serving cell (for example, the PCell and/or the PSCell), measurement using at least one RLM-RS among RLM-RSes configured in the serving cell satisfies a condition of being in-sync, the physical layer processing unit of the terminal apparatus 2 may notify a higher layer of in-sync. In a case that, in a serving cell (for example, the PCell and/or the PSCell), measurement using at least one RLM-RS among RLM-RSes of the D-BWP, the I-BWP, and/or the A-BWP configured for the RLM in the serving cell satisfies a condition of being in-sync, the physical layer processing unit of the terminal apparatus 2 may notify a higher layer of in-sync.

In the primary cell, the radio resource control layer processing unit of the terminal apparatus 2 may start or restart the counting of the timer T310 in a case that out-of-sync notified from the physical layer processing unit is consecutively received a predetermined number of times (N310 times). In addition, the radio resource layer processing unit of the terminal apparatus 2 may stop the counting of the timer T310 in a case that in-sync is consecutively received a predetermined number of times (N311 times). In a case that the counting of the timer T310 expires without stopping, the radio resource control layer processing unit of the terminal apparatus 2 may transition to an idle state or perform the reconfiguration procedure of the RRC connection. For example, the operation of the terminal apparatus 2 may differ in accordance with an establishment state of AS Security. First, in a case that the AS Security is not established, the terminal apparatus 2 transitions to the RRC idle state, and in a case that the AS Security is established, the terminal apparatus 2 performs the reconfiguration procedure of the RRC connection (an RRC Connection Re-establishment procedure).

In addition, in the primary secondary cell, the radio resource control layer processing unit of the terminal apparatus 2 may start or restart the counting of the timer T313 in a case that out-of-sync notified from the physical layer processing unit is consecutively received a predetermined number of times (N313 times). The radio resource layer processing unit of the terminal apparatus 2 may stop the counting of the timer (T313) in a case that in-sync has been consecutively received a predetermined number of times (N314 times). In a case that the counting of the timer T313 expires without stopping, the radio resource control layer processing unit of the terminal apparatus 2 performs an SCG failure information procedure for notifying a network of an SCG failure.

The radio resource control layer processing unit of the terminal apparatus 2 may stop the counting of the timer T310 at a time when the D-BWP is reconfigured in the primary cell. In addition, the radio resource control layer processing unit of the terminal apparatus 2 may stop the counting of the timer (T313) at a time when the D-BWP is reconfigured in the primary secondary cell.

Although an example of a case that no DRX is configured in the terminal apparatus 2 has been described as above, in a case that the DRX is configured in the terminal apparatus 2, the radio resource control layer processing unit of the terminal apparatus 2 may also configure the physical layer processing unit such that a period for measuring radio link quality and a notification interval for a higher layer have values different from those of a case that no DRX is configured. Even in a case that the DRX is configured, at a time when the counting of the timers T310 and T313 described above is performed, a period for measuring radio link quality for estimating in-sync and a notification interval for a higher layer may be configured to have the values of a case that no DRX is configured.

In a case that the RLM-RS is not configured from a network explicitly or implicitly it may be undefined. In other words, in a case that the RLM-RS has not been configured from a network (for example, the base station apparatus 3), the terminal apparatus 2 may not monitor radio links.

The RLM-RS is a reference signal used in radio link monitoring, and multiple RLM-RSes may be configured in the terminal apparatus 2. Resources of one RLM-RS may be resources (or ports) of one SS block or resources (or ports) of one CSI-RS. In a case of performing CSI-RS based radio link monitoring, as resources of the RLM-RS, resources configured for each terminal apparatus 2 may be used. Resources of the RLM-RS configured for each terminal apparatus 2 may be further configured for each BWP. In a case of performing SS block-based radio link monitoring, an SS block may be configured for each serving cell, may be configured for each BWP, or may be configured for each terminal apparatus 2. In the case of performing SS block-based radio link monitoring, the terminal apparatus 2 may perform the radio link monitoring using a PSS and/or an SSS included in the SS block, and/or a demodulation reference signal (DMRS) for demodulating the SS block, and/or a PBCH. Whether the CSI-RS based radio link monitoring or the SS block (also referred to as a SS/PBCH block)-based radio link monitoring is performed is configured in the terminal apparatus 2 in accordance with information received by the terminal apparatus 2 from the base station apparatus 3.

In addition, a parameter designating a frequency position of RLM-RS may be included in the configuration of the RLM-RS. As the parameter designating the frequency position, an ARFCN may be used, or an offset from a specific subcarrier of the serving cell may be used. In addition, the unit of the offset may be a unit of the subcarrier or a unit of the resource block. Furthermore, both the ARFCN and the offset may be configured.

As a parameter designating a timing at which the RLM-RS is measured, an RLM-RS based Measurement Timing Configuration (RMTC) may be configured in the terminal apparatus 2. The RMTC may be independently configured for each RLM-RS or for each RLM-RS group. The terminal apparatus 2 may not perform radio link monitoring in a case that a configuration of the RMTC is not performed from a network (for example, the base station apparatus 3).

The measurement will be described.

In the measurement of NR, mechanisms of measurement configuration and measurement report equivalent to those of LTE may be used. For example, in information elements of the measurement configuration of NR, addition and/or modification and/or deletion of configurations of a measurement identifier measId, measurement objects (Measurement objects), and Reporting configurations, a quantity configuration quantityConfig, a measurement gap configuration measGapConfig, a serving cell quality threshold s-Measure, and the like may be included.

In addition, a measurement object NR is included in a measurement object, and the measurement object NR (measObjectNR) may include some or all of NR carrier frequency information (nr-Carrierinfo), a configuration of a reference signal used for measurement, an offset frequency offsetFreq, information relating to white cell list, information relating to a black cell list, and information relating to a configuration of a gap.

In the reporting configurations, a reporting configuration NR (reportConfigNR) is included, and information relating to event trigger reporting may be included in the reporting configuration NR. As event triggering criteria, events equivalent to events A1 to A6 of LTE may be included.

Hereinafter, an example of the measurement of NR will be described. Information included in a message and/or the structure of the message are examples and are not limited thereto.

The base station apparatus 3 transmits measurement configuration information elements to the terminal apparatus 2 by using an RRC reconfiguration (RRCReconfiguration) message that is RRC signaling (a radio resource control signal). The terminal apparatus 2 receives measurement configuration information elements from the base station apparatus 3 by using an RRC reconfiguration (RRCReconfiguration) message that is RRC signaling (a radio resource control signal). The terminal apparatus 2 configures system information included in a measurement configuration information element and performs measurement, event evaluations, and measurement reporting for a serving cell and a neighbor cell (including a listed cell and/or a detected cell) in accordance with the notified system information. The listed cell is a cell listed in a measurement object (a cell that is notified as a neighbor cell list from the base station apparatus 3 to the terminal apparatus 2), and the detected cell is a cell that has been detected by the terminal apparatus 2 for a frequency indicated by the measurement object and is not listed in the measurement object (a cell that has not been notified as a neighbor cell list and has been detected by the terminal apparatus 2).

There are three types of measurements (intra-frequency measurements, inter-frequency measurements, and inter-radio access technology (RAT) measurements. The intra-frequency measurements are measurements at a downlink frequency of a serving cell (downlink frequency). The inter-frequency measurements are measurements at a frequency different from the downlink frequency of the serving cell. The inter-RAT measurements are measurements using radio technologies (for example, EUTRA, UTRA, GERAN, CDMA2000, and the like) different from a radio technology (for example, NR) of the serving cell. In a case that BWPs are configured, measurements within the same serving cell at a frequency different from that of the A-BWP may be regarded as an inter-frequency measurement. As another example, in a case that BWPs are configured, measurements within the same serving cell at a frequency different from that of the I-BWP may be regarded as inter-frequency measurements. As another example, in a case that BWPs are configured, measurements within the same serving cell at a frequency different from that of the D-BWP may be regarded as inter-frequency measurements.

In the measurement configuration message, a measurement identifier (measId), measurement objects, addition and/or modification and/or deletion of configurations of reporting configurations, a quantity configuration (quantityConfig), a measurement gap configuration (measGapConfig), a serving cell quality threshold (s-Measure) and the like are included.

Quantity Configuration (quantityConfig)

In a case that the measurement objects are measurement objects of NR or EUTRA, in the quantity configuration (quantityConfig), a third layer filtering coefficient (L3 filtering coefficient) may be designated. The third layer filtering coefficient (L3 filtering coefficient) defines a ratio (proportion) between a latest measurement result and a filtering measurement result in the past. The filtering result is used by the terminal apparatus 2 for evaluating an event.

Measurement Gap Configuration (measGapConfig)

The Measurement gap configuration (measGapConfig) is used for controlling the configuration of a measurement gap pattern and activation/deactivation of a measurement gap. In the measurement gap configuration (measGapConfig), as information for activating the measurement gap, a gap pattern, a start system frame number (startSFN), and a start subframe number (startSubframeNumber) are notified. The gap pattern defines a certain pattern to be used as a measurement gap. The start system frame number (startSFN) defines a System Frame Number (SFN) from which the measurement gap starts. The start subframe number (startSubframeNumber) defines a subframe number from which the measurement gap starts. The measurement gap configuration may be configured independently for each cell, for each cell group, for each BWP, or for each RLM-RS. The measurement gap configuration may be included in MeasConfig, may be included in MeasObject, or any other information element.

Serving Cell Quality Threshold (s-Measure)

The serving cell quality threshold (s-Measure) represents a threshold relating to the quality of a serving cell and is used for controlling whether the terminal apparatus 2 needs to perform measurement. The serving cell quality threshold (s-Measure) is configured as a value for a reference signal received power (RSRP).

Measurement Identifier (measId)

Here, the measurement identifier (measId) is used for linking measurement objects and reporting configurations to each other and more specifically, links measurement object identifiers (measObjectId) and reporting configuration identifiers (reportConfigId) to each other. One measurement object identifier (measObjectId) and one reporting configuration identifier (reportConfigId) are associated with the measurement identifier (measId). The measurement configuration message can be used for adding, modifying, and deleting relationships between measurement identifiers (measId), measurement objects, and reporting configurations.

measObjectToRemoveList is a command for deleting a measurement object corresponding to a designated measurement object identifier (measObjectId) and a designated measurement object identifier (measObjectId). At this time, all the measurement identifiers (measId) associated with the designated measurement object identifier (measObjectId)

are deleted. The command can simultaneously designate multiple measurement object identifiers (measObjectId).

measObjectToAddModifyList is a command for modifying a designated measurement object identifier (measObjectId) to a designated measurement object or adding a designated measurement object identifier (measObjectId) and a designated measurement object. The command can simultaneously designate multiple measurement object identifiers (measObjectId).

reportConfigToRemoveList is a command for deleting a designated reporting configuration identifier (reportConfigId) and reporting configurations corresponding to the designated reporting configuration identifier (reportConfigId). At this time, all the measurement identifiers (measId) associated with the designated reporting configuration identifier (reportConfigId) are deleted. This command can simultaneously designate multiple reporting configuration identifiers (reportConfigId).

reportConfigToAddModifyList is a command for modifying a designated reporting configuration identifier (reportConfigId) to a designated reporting configuration or adding a designated reporting configuration identifier (reportConfigId) and a designated reporting configuration. This command can simultaneously designate multiple reporting configuration identifiers (reportConfigId).

measIdToRemoveList is a command for deleting a designated measurement identifier (measId). At this time, the measurement object identifier (measObjectId) and the reporting configuration identifier (reportConfigId) associated with the designated measurement identifier (measId) are maintained without being deleted. The command can simultaneously designate multiple measurement identifiers (measId).

measIdToAddModifyList is a command for associating a designated measurement identifier (measID) with a designated measurement object identifier (measObjectId) and a designated reporting configuration identifier (reportConfigId) or associating a designated measurement object identifier (measObjectId) and a designated reporting configuration identifier (reportConfigId) with a designated measurement identifier (measId) to add a designated measurement identifier (measId). The command can simultaneously designate multiple measurement identifiers (measId).

Measurement Objects

Measurement objects are defined for each RAT and each frequency. In addition, in the reporting configurations, there are a definition for NR and a definition for the RAT other than NR.

The measurement objects may include a measurement object NR (measObjectNR), a measurement object EUTRA (measObjectEUTRA), a measurement object UTRA (measObjectUTRA), a measurement object GERAN (measObjectGERAN), a measurement object CDMA2000 (measObjectCDMA2000), a measurement object WLAN (measObjectWLAN), and the like associated with a measurement object identifier (measObjectId).

The measurement object identifier (measObjectId) is an identifier used for identifying configurations of measurement objects. The configuration of a measurement object, as described above, is defined for each Radio Access Technology (RAT) and for each frequency. The specifications of measurement objects are separately provided for NR, EUTRA, UTRA, GERAN, and CDMA2000. The measurement object NR (measObjectNR) that is a measurement object for NR defines information to be applied to a neighbor NR cell (and a BWP within the serving cell). In addition, a measurement object NR (measObjectNR) of a different frequency is handled as a different measurement object, and is assigned a measurement object identifier (measObjectId).

Next, information included in the measurement object NR (measObjectNR) will be described. NR carrier frequency information (nr-Carrierinfo) specifies a carrier frequency to be measured. An offset frequency (offsetFreq) indicates a measurement offset value to be applied to a frequency to be measured.

Information relating to a black cell list includes information relating to neighbor cells that are not objects for event evaluation or measurement reporting. The Information relating to a black cell list includes a physical cell identity (physical cell ID) and the like. In a case of NR, this information may be used as information for adding, modifying, or deleting a list of cells considered as black cells (black listed cell list) that has been acquired by the terminal apparatus 2 from broadcast information.

In addition, in the measurement configuration message, information on BWPs of the PCell and/or the SCell used for the measurement may be included. The information on the BWPs may include some or all of (A) Type of cyclic prefix, (B) Subcarrier spacing, (C) Frequency position (for example, a frequency offset (for example, in units of subcarriers and/or units of PRBs) from a reference point (for example, a subcarrier) to a BWP in a serving cell), (D) Bandwidth of BWP (for example, the number of PRBs), (E) Resource configuration information of a control signal, and (F) Information (for example, an identifier) for identifying each BWP. The information on the BWPs may be information related to resources of the SS block and/or the CSI-RS. The Information on the BWPs may be notified using a message other than the measurement configuration message (for example, an RRC reconfiguration message).

Reporting Configurations

The reporting configurations include a reporting configuration NR (reportConfigNR) associated with a reporting configuration identifier (reportConfigId) and the like.

The reporting configuration identifier (reportConfigId) is an identifier that is used for identifying a reporting configuration relating to measurement. As described above, in the reporting configuration relating to measurement, there are a definition for NR and definitions for RATs other than NR (EUTRA, UTRA, GERAN, and CDMA2000). The reporting configuration NR (reportConfigNR) that is a reporting configuration for NR defines triggering criteria of an event used for reporting measurement in NR.

The reporting configuration NR (reportConfigNR) may include some or all of an event identifier (eventId), a trigger quantity (triggerQuantity), hysteresis, a time to trigger (timeToTrigger), a reporting quantity (reportQuantity), the maximum number of cells to be reported (maxReportCells), a reporting interval (reportInterval), and the number of times of reporting (reportAmount) may be included.

Next, the reporting configuration NR (reportConfigNR) will be described. The event identifier (eventId) is used for selecting criteria relating to event triggered reporting. Here, the event triggered reporting is a method for reporting measurement in a case that the event triggering criteria are satisfied. In addition, there is also an event triggered periodic reporting that is a certain number of times of reporting of measurement at a predetermined interval in a case that the event triggering criteria are satisfied.

At least six types of event triggering criteria to be described below may be defined. In a case that the event triggering criteria designated by the event identifier (eventId) are satisfied, the terminal apparatus 2 performs measurement report for the base station apparatus 3. The trigger quantity (triggerQuantity) is a quantity that is used for evaluating the event triggering criteria. In other words, as the trigger quantity, a reference signal received power (RSRP) or a reference signal received quality (RSRQ) is designated. In other words, the terminal apparatus 2 measures a downlink synchronization signal by using a quantity designated by the trigger quantity (triggerQuantity) and determines whether the event triggering criteria designated by the event identifier (eventId) are satisfied. The hysteresis is a parameter that is used in the event triggering criteria. The trigger time (timeToTrigger) indicates a period in which the event triggering criteria are to be satisfied. The reporting quantity (reportQuantity) indicates a reporting quantity in the measurement report. Here, as the reporting quantity, a quantity designated by the triggering quantity, a reference signal received power (RSRP), or a reference signal received quality (RSRQ) is designated. Here, the reference signal received quality (RSRQ) is a ratio represented by (N*RSRP)/(NR Carrier RSSI). The received signal intensity (NR Carrier RSSI) indicates the intensity of total received signal power, and the measurement bandwidth is the same as the system bandwidth. N is the number of Resource Blocks (RBs) relating to the measurement bandwidth of the received signal intensity (NR Carrier RSSI). The maximum number of cells to be reported (maxReportCells) indicates a maximum number of cells included in the measurement report. The reporting interval (reportInterval) is used for periodical reporting or event triggered periodic reporting, and the periodical reporting is performed at every interval represented by the reporting interval (reportInterval). The number of times of reporting (reportAmount) defines the number of times of performing periodical reporting as necessary.

Threshold parameters and offset parameters (a1_Threshold, a2_Threshold, a3_Offset, a4_Threshold, a5_Threshold1, a5_Threshold2, and a6_Offset) used in the event triggering criteria described below are notified to the terminal apparatus 2 together with the event identifier (eventId) in the reporting configuration NR (reportConfigNR).

Event Triggering Criteria

Multiple event triggering criteria for measurement report are defined, and there are entering criteria and leaving criteria. In other words, the terminal apparatus 2 that satisfies the entering criteria for an event designated from the base station apparatus 3 transmits a measurement report to the base station apparatus 3. In addition, the terminal apparatus 2 that satisfies the leaving criteria for an event designated from the base station apparatus 3 transmits, in a case of being configured from the base station apparatus 3 such that a report is triggered in a case that the leaving criteria are satisfied (in a case that reportOnLeave is included in the reporting configuration), a measurement report to the base station apparatus 3. The entering criteria and the leaving criteria for each event are as follows.

Event A1
  Event A1 entering criteria: Ms−Hys>a1_Threshold
  Event A1 leaving criteria: Ms+Hys<a1_Threshold
Event A2
  Event A2 entering criteria: Ms−Hys<a2_Threshold
  Event A2 leaving criteria: Ms+Hys>a2_Threshold
Event A3
  Event A3 entering criteria: Mn+Ofn+Ocn−Hys>Ms+Ofs+Ocs+a3_Offset
  Event A3 leaving criteria: Mn+Ofn+Ocn+Hys<Ms+Ofs+Ocs+a3_Offset
Event A4
  Event A4 entering criteria: Mn+Ofn+Ocn−Hys>a4_Threshold
  Event A4 leaving criteria: Mn+Ofn+Ocn+Hys<a4_Threshold
Event A5
  Event A5 entering criteria: Ms−Hys<a5_Threshold1, Mn+Ofn+Ocn−Hys>a5_Threshold2
  Event A5 leaving criteria: Ms+Hys>a5_Threshold1 and Mn+Ofn+Ocn+Hys<a5_Threshold2
Event A6
  Event A6 entering criteria: Mn+Ocn−Hys>Ms+Ocs+a6_Offset
  Event A6 leaving criteria: Mn+Ocn+Hys<Ms+Ocs+a6_Offset Here, Ms is a measurement result for the serving cell (a cell-specific measurement offset value is not taken into account). Mn is a measurement result for a neighbor cell. Hys is a hysteresis parameter for a target event.

Ofn is a frequency-specific measurement offset value for a frequency of the neighbor cell. Ofn corresponds to the offset frequency (offsetFreq) of the measurement object NR (measObjectNR). In a case of intra-frequency measurements, Ofn is the same as Ofs. In a case of inter-frequency measurements, Ofn is an offset frequency (offsetFreq) included in the measurement object NR (measObjectNR) corresponding to a downlink frequency that is different from that of the serving cell.

Ocn is a cell-specific measurement offset value for the neighbor cell. Ocn corresponds to a cell-specific offset (cellIndividualOffset) of the measurement object NR (measObjectNR). In a case that the Ocn is not configured, the measurement offset value is configured to 0. In the case of intra-frequency measurements, Ocn is a cell-specific offset (cellIndividualOffset) included in a measurement object NR (measObjectNR) of the same downlink frequency as that of the serving cell. In the case of inter-frequency measurements, Ocn is a cell-specific offset (cellIndividualOffset) included in a measurement object EUTRA (measObjectEUTRA) corresponding to a downlink frequency different from that of the serving cell.

Ofs is a frequency-specific offset value for the frequency of the serving cell. Ofs corresponds to an offset frequency (offsetFreq) of the measurement object NR (measObjectNR).

Ocs is a cell-specific measurement offset value for the serving cell. Ocs is included in a cell-specific offset (cellIndividualOffset) of a measurement object NR (measObjectNR) at the frequency of the serving cell.

a1_Threshold is a threshold parameter to be used for the event A1. a2_Threshold is a threshold parameter to be used for the event A2. a3_Offset is an offset parameter to be used for the event A3. a4_Threshold is a threshold parameter to be used for the event A4. a5_Threshold 1 and a5_Threshold 2 are threshold parameters to be used for the event A5. a6_Offset is an offset parameter to be used for the event A6.

The terminal apparatus 2 causes each event to occur in accordance with the measurement result Ms of the serving cell and the measurement result Mn of the neighbor cell. After each parameter is applied, the event A1 occurs in a case that the measurement result Ms of the serving cell is better than the threshold a1_Threshold, and the event A2 occurs in a case that the measurement result Ms is worse than the threshold a2_Threshold. The event A3 occurs in a case that the measurement result Mn of the neighbor cell is better than the cell measurement result Ms of the serving cell and the offset a3_Offset after each parameter is applied, and the event A4 occurs in a case that the measurement result Mn of the neighbor cell is better than the threshold value a4_Threshold after each parameter is applied. The event A5 occurs in a case that the measurement result Ms of the serving cell is worse than the threshold a5_Threshold1 after the application of each parameter, and the measurement result Mn of the neighbor cell is better than the threshold a5_Threshold2 after the application of each parameter.

In addition, in the reporting configuration InterRAT (reportConfigInterRAT) that is a reporting configuration for the RAT other than NR, the triggering criteria for an event used for reporting measurements in the RAT other than NR may be defined. For example, event B1 may be caused to occur in a case that the measurement result of the neighbor cell (another RAT) is better than a threshold b1_Threshold configured for each RAT after each parameter is applied. In addition, event B2 may be caused to occur in a case that the measurement result of the PCell is worse than a threshold value b2_Threshold1 after each parameter is applied, and the measurement result of the neighbor cell (another RAT) is better than a threshold value b2_Threshold2 configured for each RAT after each parameter is applied. The measurement result of the PCell used in the event B2, in a case that BWPs are configured, may be a measurement result derived based on the D-BWP or may be a measurement result derived based on the BWP designated in the reporting configuration. The measurement result derived based on a certain BWP may be derived based on the reception power of the SS block (for example, a PSS and an SSS included in the SS block) and/or the CSI-RS associated with the BWP. In addition, the measurement results of the PCell and the SCell may be derived based on the reception power of the SS block or the CSI-RS associated with each cell.

The base station apparatus 3 may or may not notify a serving cell quality threshold (s-Measure). In a case that the base station apparatus 3 notifies a serving cell quality threshold (s-Measure), the terminal apparatus 2 performs measurement of a neighbor cell and event evaluation (whether the event triggering criteria are satisfied; it will be also referred to as evaluation of reporting criteria) at a time when the quality (an RSRP value) of the serving cell is lower than the serving cell quality threshold (s-Measure). On the other hand, in a case that the base station apparatus 3 does not notify a serving cell quality threshold (s-Measure), the terminal apparatus 2 performs measurement of a neighbor cell and event evaluation regardless of the quality (an RSRP value) of the serving cell.

Measurement Result

The terminal apparatus 2 that satisfies the event triggering criteria transmits a measurement report to the base station apparatus 3. In the measurement reports, a measurement result is included.

The measurement result includes a measurement identifier (measId), a serving cell measurement result (measResultServing), and an NR measurement result list (measResultListNR). Here, in the NR measurement result list (measResultListNR), a physical cell identity (physicalCellIdentity) and an NR cell measurement result (measResultNR) may be included.

Here, the measurement identifier (measId), as described above, is an identifier used for a link between the measurement object identifier (measObjectId) and the reporting configuration identifier (reportConfigId). The serving cell measurement result (measResultServing) is a measurement result for the serving cell, and results of both the reference signal received power (RSRP) and the reference signal received quality (RSRQ) for the serving cell may be reported. The physical cell identity (physicalCellIdentity) is used for identifying a cell. The NR cell measurement result (measResultNR) is a measurement result for the NR cell. A measurement result for the neighbor cell is included at a time when a relating event occurs.

In a case that the cell of the MCG including a first cell is a cell of NR, and the cell of the SCG including a second cell is a cell of NR, the MCG and the SCG may be configured in an RRC message of NR. In a case that the cell of the MCG including a first cell is a cell of LTE, and the cell of the SCG including a second cell is a cell of NR, the MCG may be configured in an RRC message of LTE, and the SCG may be configured in an RRC message of NR. The parameters relating to the MCG and the parameters relating to the SCG may be configured in the RRC message of NR by using the MCG SRB. The parameters relating to the MCG may be transmitted directly using the MCG SRB. The parameters relating to the SCG may be transmitted directly using the SRB (SCG SRB) of the SCG. In such a case, the terminal apparatus 2 may receive the reporting configuration for the SCG using the SCG SRB and receive the reporting configuration for the MCG using the MCG SRB.

In a case that SCG SRB is configured, the terminal apparatus 2 that has received the RRC reconfiguration message including the radio resource configuration of the SCG relating to the SCG-Config may send a response to the radio resource configuration of the SCG relating to the SCG-Config to the SCG SRB. More specifically, in a case that the SCG SRB is configured, and the SCG SRB is configured to be used in a response relating to the SCG-Config, the response to the radio resource configuration of the SCG relating to the SCG-Config may be sent using the SCG SRB. For example, the terminal apparatus 2 that has received the RRC reconfiguration message including the radio resource configuration of the SCG relating to the SCG-Config applies a new configuration other than the SCG-Config, and in a case that the application is successful, sends an RRC reconfiguration completion message to the first base station apparatus 3 by using the MCG SRB. The terminal apparatus 2 that has received the RRC reconfiguration message including the radio resource configuration of the SCG relating to the SCG-Config applies a new configuration of the SCG-Config, and in a case that the application is successful, sends an SCG RRC reconfiguration completion message to the second base station apparatus 3 by using the SCG SRB.

The quality of the serving cell used for deriving a serving cell measurement result (measResultServing) in the measurement described above and the radio link quality of the serving cell in radio link monitoring are defined as different qualities. For example, the quality of the serving cell for deriving the serving cell measurement result (measResultServing) may be quality that is derived based on the SS block and/or the CSI-RS for cell definition, and the radio link quality of the serving cell in the radio link monitoring may be quality that is derived based on the RLM-RS. In addition, for the terminal apparatus 2, the SS block and/or the CSI-RS for cell definition may be configured as an RLM-RS.

An example of the RRC reconfiguration message will be described with reference to FIG. 8.

As shown in FIG. 8, the RRC reconfiguration message may include some or all of (8A) rrc-TransactionIdentifier and rrcReconfiguration. (8B) rrcReconfiguration may include some or all of (8C) radioBearerConfig, (8D) masterCellGroupConfig, (8E) secondaryCellGroupToAddMod- List, (8F) secondaryCellGroupToReleaseList, (8G) measConfig, (8H) dedicatedNAS-MessageList, (8I) otherConfig, and (8J) fullConfig.

(8A) rrc-TransactionIdentifier is an element (also referred to as an RRC transaction identifier) that is used for identifying an RRC procedure (transaction) and for example, has a value of an integer in the range of 0 to 3. (8B) rrcReconfiguration represents information elements used for RRC reconfiguration.

(8C) radioBearerConfig is an information element (also referred to as a radio bearer configuration) that is used for addition, modification, and release of the radio bearer (SRB/DRB) of signaling and data, and in a case that a parameter for a PDCP for a radio bearer or an SDAP is applied, a parameter for the SDAP may be carried.

(8D) masterCellGroupConfig may be used for configuring the MCG (also referred to as an MCG configuration). One cell group may include one MAC entity and a set of logical channels associated with an RLC entity. In addition, one cell group may include one primary cell (PCell) and no secondary cell (SCell) or one or more secondary cells (SCells). (8D) In masterCellGroupConfig, CellGroupConfig (also referred to as a cell group configuration) may be included.

In CellGroupConfig, some or all of an identifier used for identifying a cell group, configurations of an addition or modification of a logical channel, a configuration of release of a logical channel, a configuration of a MAC in a cell group, timers and constants used for determining a Radio Link Failure (RLF), a configuration of a primary cell, a configuration of addition or modification of a secondary cell, and a configuration of release of a secondary cell may be included.

The configuration of the primary cell may include pCellConfigDedicated, and further include, in a case of synchronization reconfiguration for a target cell (for example, a reconfiguration involving a random access procedure for a target cell, mobility (handover or the like) by network control), synchronousReconfiguration (also referred to as a synchronous reconfiguration). pCellConfigDedicated (also referred to as PCell configuration—dedicated) may include ServingCellConfigDedicated (also referred to as a serving cell configuration—dedicated). synchronousReconfiguration may include some or all of pCellConfigCommon (also referred to as PCell configuration—common), newUE-Identity indicating a new identifier (for example, C-RNTI) of the terminal apparatus 2, a value of the timer (t304) used for detecting a handover failure, and information (rach-ConfigDedicated) relating to an random access. pCellConfigCommon may include ServingCellConfigCommon. t304 indicates the value of the timer for handover. For example, the terminal apparatus 2 may perform a predetermined process in a case that the handover has not been successfully completed within a time indicated by the timer. rach-ConfigDedicated includes information that is used for identifying individual random access parameters assigned to the terminal apparatus 2. For example, some or all of information that explicitly represents a format of a random access preamble and time/frequency resources and/or information of numerologies used for transmitting a preamble may be included.

The configurations of adding and modifying secondary cells include a configuration (SCellConfig) of each secondary cell. SCellConfig may include secondary cell identity information, sCellConfigCommon, and sCellConfigDedicated. sCellConfigCommon may include ServingCellConfigCommon. sCellConfigDedicated may include ServingCellConfigDedicated.

ServingCellConfigCommon is used for configuring cell-specific parameters of the serving cell of the terminal apparatus 2. This information element may include parameters that are standardly acquired from broadcast information (system information) in a case that the terminal apparatus 2 accesses a cell from an idle state. ServingCellConfigCommon may include some or all of a physical cell identity of a serving cell, information relating to a carrier frequency of a downlink, information relating to the frequency of the BWP of a downlink, frequency information of an uplink, information relating to subcarrier spacing, information relating to the position of an SS block, information relating to the position of a DMRS, and information relating to a random access. ServingCellConfigDedicated is used for configuring terminal apparatus-specific parameters of the serving cell of the terminal apparatus 2. ServingCellConfigDedicated may include some or all of the information relating to one or multiple BWPs, the configuration information of the PDCCH, the configuration information of the PDSCH, the configuration information of the PUCCH, and the configuration information of the PUSCH. The information relating to the BWPs may include information relating to the BWPs of the downlink and/or information relating to the BPWs of the uplink. The information of each BWP may include some or all of information indicating a position of the BWP, information indicating a bandwidth of the BWP, information indicating the subcarrier spacing, and information indicating a length of a cyclic prefix.

(8E) secondaryCellGroupToAddModList may be used for configuring one or multiple SCGs. (8E) secondaryCellGroupToAddModList may include CellGroupConfig described above for each of the one or multiple SCGs. (8F) secondaryCellGroupToReleaseList may be used for releasing the one or multiple SCGs.

(8G) measConfig is information for configuring measurement to be performed by the terminal apparatus 2 and may include a configuration of a gap for the measurement.

(8H) dedicatedNAS-MessageList is a list of information of terminal apparatus 2-specific NAS layer exchanged between a network and the terminal apparatus 2 and includes information of NAS layer for each DRB, and the RRC layer transparently transmits the information to a higher layer (NAS layer).

(8I) otherConfig includes some or all of other configurations. (8J) fullConfig may be included in the RRC reconfiguration message. In such a case, a configuration included in a specific element may be applied.

In order to notify that the RRC reconfiguration is successfully completed, the terminal apparatus 2 that has received the RRC reconfiguration message transmits an RRC reconfiguration completion message (RRCReconfigurationComplete message) to the base station apparatus 3. The RRCReconfigurationComplete message may include, similar to LTE, in a case that one or multiple SCells are configured in RRCReconfiguration for carrier aggregation, information (perCC-GapIndicationList) indicating preference of a measurement gap (whether a gap is necessary) for each component carrier (serving cell) by the terminal apparatus 2. perCC-GapIndicationList may be configured to be transmitted in a case that information (perCC-GapIndicationRequest) for requesting perCC-GapIndication is included in the RRCReconfiguration message. The measurement gap in this case is referred to as a Type 1 gap. The Type 1 gap may be used for inter-frequency measurement and/or inter-RAT measurement.

In order to notify that the RRC reconfiguration is successfully completed, the terminal apparatus 2 that has received the RRC reconfiguration message transmits an RRC reconfiguration completion message (RRCReconfigurationComplete message) to the base station apparatus 3. The RRCReconfigurationComplete message may include, in a case that one or multiple BWPs are configured in RRCReconfiguration, information (bwp-GapIndicationList) for indicating preference of a gap (whether a gap is necessary) by the terminal apparatus 2 to measure a serving cell by using an SS block for cell definition of the serving cell (for example, measurement of a serving cell by using an SS block for cell definition in a time section configured by the system information of the serving cell or SSB-MeasurementTimingConfiguration (SMTC) included in the RRC reconfiguration message. The gap in this case is referred to a Type 2 gap. The Type 2 gap may be used for intra-frequency measurement of the serving cell. The SMTC may include SMTC1 and SMTC2 as configurations. The SMTC1 may be a configuration of a measurement timing applied to intra-frequency measurement and inter-frequency measurement, and the configuration of the SMTC1 may include information relating to a timing (periodicity and offset) and a period (duration) of an SS block to be received for the measurement. The SMTC2 may be a configuration of a measurement timing applied to the measurement of the cell that is explicitly indicated within the frequency, and the configuration of the SMTC2 may include information of a physical cell identity and information of periodicity. In addition, Offset and Duration of the SS block of the SMTC2 may be the same as those provided in the SMTC1. The Type 2 gap may be used for the measurement of the serving cell by using the SS block for cell definition in a time section configured by the SMTC1. bwp-GapIndicationList may be configured to be transmitted in a case that information (bwp-GapIndicationRequest) used for requesting bwp-GapIndication is included in the RRCReconfiguration message. bwp-GapIndicationList described above is a list including one or multiple sets (gap preference BWPs) of a serving cell identity and a gap preference corresponding thereto. In a case that the gap preference BWP is configured, at a time when a BWP not including the frequency domain of the SS block for cell definition becomes an A-BWP, information for indicating whether a gap is necessary for the measurement of a serving cell by using the SS block for cell definition may be notified to the base station apparatus 3 as a gap indication (bwp-GapIndication). Alternatively, information for indicating whether a gap is necessary for the measurement of a serving cell at a time when the D-BWP becomes the A-BWP may be notified to the base station apparatus 3 as a gap indication. In addition, in a case that a situation of whether a gap is necessary for the measurement of the serving cell by using the SS block for cell definition changes, information for indicating whether a gap is necessary for the measurement of the serving cell by using the SS block for cell definition may be configured to be notified to the base station apparatus 3. This allows, even in a case that multiple BWPs are configured for each serving cell, the information to be information for each serving cell instead of information for each BWP, thus decreasing the amount of information to be notified. In addition, information for indicating whether a gap is necessary for the measurement of cell quality of the serving cell in at least one BWP that has been configured may be notified to the base station apparatus 3 as a gap indication. Furthermore, information for indicating whether a gap is necessary for the measurement of cell quality of a serving cell in a BWP not including a frequency band of at least one I-BWP that has been configured may be notified to the base station apparatus 3 as a gap indication. Information for indicating whether a gap is necessary for the measurement of cell quality of a serving cell in a BWP not including a frequency band of at least one SS block for cell definition that has been configured may be notified to the base station apparatus 3 as a gap indication. In addition, information for indicating whether a gap is necessary for the measurement of cell quality of a serving cell in each BWP that has been configured may be notified to the base station apparatus 3 as a gap indication. This allows whether a gap is necessary to be notified using a smaller size of information than the information used in a case that whether a gap is necessary is notified for all the combinations of the cells and the configurations of the BWP that are supported by the terminal apparatus 2. A list (bwp-GapIndicationList) of one or more pieces of bwp-GapIndication may be included in the RRCReconfigurationComplete message instead of the perCC-GapIndicationList. In addition, bwp-GapIndication may be included in the perCC-GapIndicationList of the RRCReconfigurationComplete message.

In a case that the BWP and MeasConfig each are configured using a common or different RRCReconfiguration message, information for indicating whether a gap is necessary for the measurement of each MeasObject in the D-BWP may be notified to the base station apparatus 3. In a case that the BWP and MeasConfig each are configured using a common or different RRCReconfiguration message, information for indicating whether a gap is necessary for the measurement of each MeasObject in the I-BWP may be notified to the base station apparatus 3. In addition, information for indicating whether a gap is necessary for the measurement of each MeasObject in at least one BWP that has been configured may be notified to the base station apparatus 3. In addition, information for indicating whether a gap is necessary for the measurement of each MeasObject in a BWP not including a frequency band of at least one I-BWP that has been configured may be notified to the base station apparatus 3. In addition, information for indicating whether a gap is necessary for the measurement of each MeasObject in a BWP not including a frequency band of at least one SS block for cell definition that has been configured may be notified to the base station apparatus 3. In addition, information for indicating whether a gap is necessary for the measurement of each MeasObject that has been configured may be notified to the base station apparatus 3. This allows whether a gap is necessary to be notified using a smaller size of information than the information used in a case that whether a gap is necessary is notified for all the combinations of the cells and the configurations of the BWP that are supported by the terminal apparatus 2.

In a case that the BWP and MeasConfig each are configured using a common or different RRCReconfiguration message, information for indicating whether a gap is necessary for at least one of the measurement of the cell quality of the cell serving cell and the measurement of each MeasObject in the D-BWP may be notified to the base station apparatus 3. In a case that the BWP and MeasConfig each are configured using a common or different RRCReconfiguration message, information for indicating whether a gap is necessary for at least one of the measurement of the cell quality of the serving cell and the measurement of each MeasObject in the I-BWP may be notified to the base station apparatus 3. In addition, information for indicating whether a gap is necessary for at least one of the measurement of the cell quality of the serving cell and the measurement of each MeasObject in at least one BWP that has been configured may be notified to the base station apparatus 3. Furthermore, information for indicating whether a gap is necessary for at least one of the measurement of cell quality of a serving cell and the measurement of each MeasObject in a BWP not including a frequency band of at least one I-BWP that has been configured may be notified to the base station apparatus 3. In addition, information for indicating whether a gap is necessary for at least one of the measurement of cell quality of a serving cell and the measurement of each MeasObject in a BWP not including a frequency band of at least one SS block for cell definition that has been configured may be notified to the base station apparatus 3. Furthermore, information for indicating whether a gap is necessary for the measurement of cell quality of a serving cell in each BWP that has been configured and the measurement of each MeasObject that has been configured may be notified to the base station apparatus 3. This allows whether a gap is necessary to be notified using a smaller size of information than the information used in a case that whether a gap is necessary is notified for all the combinations of the cells and the configurations of the BWP that are supported by the terminal apparatus 2.

The information for indicating whether a gap is necessary for the measurement of cell quality of a serving cell in each BWP described above may be notified for each of serving cells (for example, they are allocated in order of identifiers of BWPs) as a bit map or may be information of a list type including a combination of identifier information of the BWP and an Enumerated type or Boolean-type information for indicating whether a gap is necessary. For example, a serving cell identity and preference of a gap corresponding thereto are information for indicating whether a gap is necessary, and the preference of the gap may be one bit, a bit map, or an identifier of the BWP. In a case that the preference of the gap is a bit map, bits respectively correspond to multiple BWPs that have been configured. In addition, in a case that the preference of the gap is an identifier of the BWP, the information may be information representing identifiers of one or more BWPs requiring a gap.

Furthermore, whether the information for indicating whether each of the gaps described above is necessary is notified to the base station apparatus 3 may be determined based on information for requesting bwp-GapIndication (for example, bwp-GapIndicationRequest) in the RRCReconfiguration message.

Figure 9:
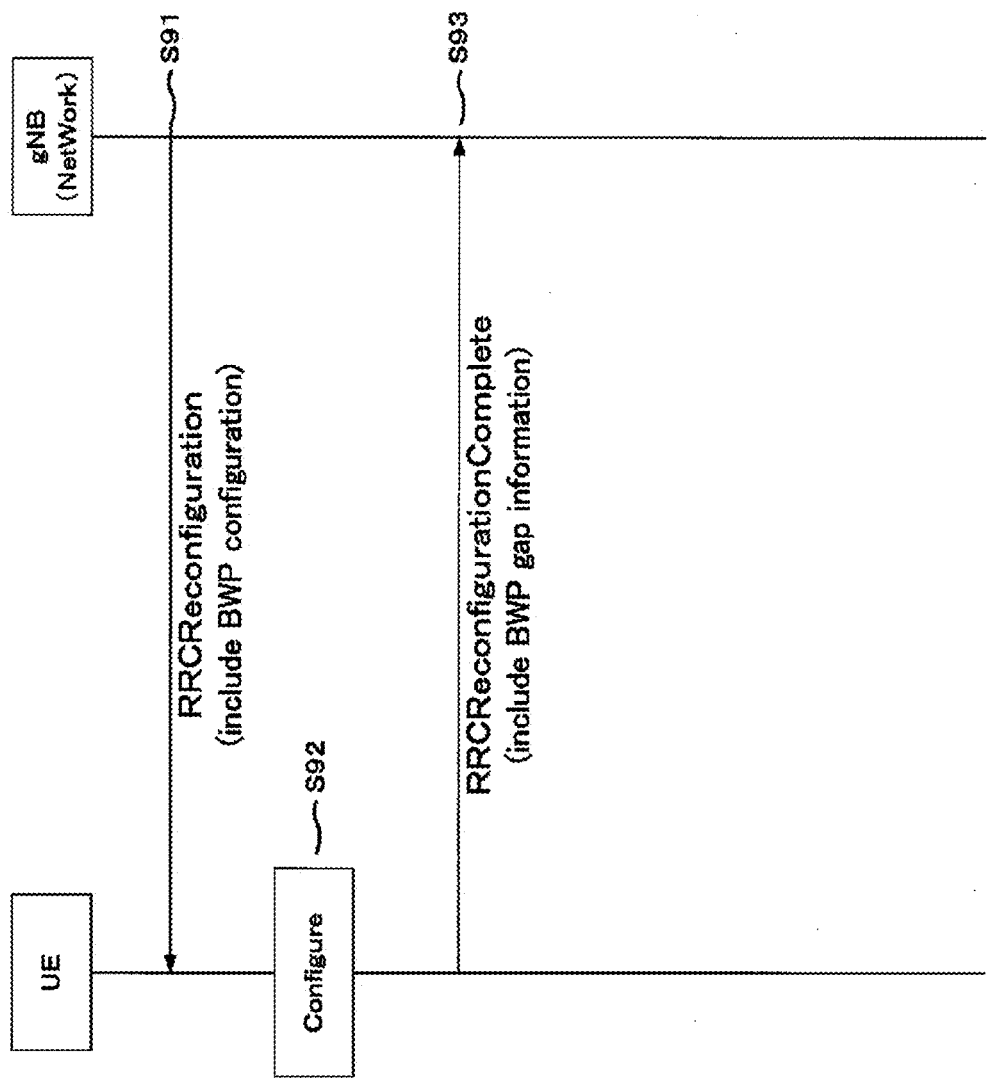
FIG. 9 is a diagram illustrating an example of a gap indication notification procedure according to an embodiment of the present invention.

FIG. 9 illustrates an example of a procedure relating to notification of a gap indication. The terminal apparatus 2 receives an RRC reconfiguration message including first downlink bandwidth part (BWP) information of a serving cell and no second downlink BWP information or one or more pieces of second downlink BWP information from a network (the base station apparatus 3) (step S91). Here, the first downlink BWP information may be information relating to the configuration of the D-BWP of the downlink. The second downlink BWP information may be information relating to the configuration of BWPs other than the D-BWP of the downlink. The first downlink BWP information may be information relating to the configuration of the I-BWP of the downlink. The second downlink BWP information may be information relating to the configuration of BWPs other than the I-BWP of the downlink. The terminal apparatus 2 that has received the RRC reconfiguration message performs configuration based on information included in the RRC reconfiguration message (step S92). In addition, in step S92, whether the gap relating to the BWP is necessary (for example, whether a gap is necessary for the measurement of cell quality of a serving cell in the D-BWP) may be determined. The terminal apparatus 2 that has normally processed the RRC reconfiguration message transmits an RRC reconfiguration completion message to the network (the base station apparatus 3) (step S93).

FIG. 10 illustrates an example of an RRC reconfiguration completion message. As shown in FIG. 10, the RRC reconfiguration completion message includes some or all of (A) rrc-TransactionIdentifier, (B) rlf-InfoAvailable, (C) perCC-GapIndicationList, and (D) bwp-GapIndicationList. rrc-TransactionIdentifier is information for indicating an identifier of the transaction. rlf-InfoAvailable is information for indicating whether information relating to a radio link failure (RLF) is present.

According to the procedure illustrated in FIG. 9, whether a gap is necessary can be notified using a smaller size of information than the information used in a case that whether a gap is necessary is notified for all the combinations of the cells and the configurations of BWPs supported by the terminal apparatus 2.

Next, an example in which whether a gap is necessary is indicated in a case that the terminal apparatus 2 capable of configuring BWPs notifies the base station apparatus 3 of capability of the terminal apparatus is described.

In LTE, UE-EUTRA-Capability is prepared as an information element used for notifying the base station apparatus 3 of the capability of the terminal apparatus. UE-EUTRA-Capability includes measParameters as parameters relating to measurement. measParameters include a list of band combinations supported by the terminal apparatus 2, and each of the band combinations includes a parameter (interFreqNeedForGaps) used for notifying whether a measurement gap is necessary for each band.

An example in which interFreqNeedForGaps represents different information is described. For example, in a case that no BWP has not been configured, similar to the existing manner, in each band combination supported by the terminal apparatus 2, the terminal apparatus 2 configures information for indicating whether a measurement gap is necessary for each band. In a case that a BWP has been configured, in each of band combinations supported by the terminal apparatus 2, for each band, any one or a combination of (A) Information for indicating whether a gap is necessary for measurement of cell quality of a serving cell in a D-BWP, (B) Information for indicating whether a gap is necessary for measurement of cell quality of a serving cell in at least one BWP that has been configured, (C) Information for indicating whether a gap is necessary for measurement of each MeasObject in a D-BWP, (D) Information for indicating whether a gap is necessary for measurement of each MeasObject in at least one BWP that has been configured, (E) Information for indicating whether a gap is necessary for at least one of measurement of cell quality of a serving cell and measurement of each MeasObject in a D-BWP, (F) Information for indicating whether a gap is necessary for at least one of measurement of cell quality of a serving cell and measurement of each MeasObject in at least one BWP that has been configured, (G) Information for indicating whether a gap is necessary for measurement of cell quality of a serving cell in an I-BWP, (H) Information for indicating whether a gap is necessary for measurement of each MeasObject in an I-BWP, (I) Information for indicating whether a gap is necessary for at least one of measurement of cell quality of a serving cell and measurement of each MeasObject in an I-BWP, (J) Information for indicating whether a gap is necessary for measurement of cell quality of a serving cell in a BWP not including a frequency band of at least one I-BWP that has been configured, (K) Information for indicating whether a gap is necessary for measurement of each MeasObject in a BWP not including a frequency band of at least one I-BWP that has been configured, (L) Information for indicating whether a gap is necessary for at least one of measurement of cell quality of a serving cell and measurement of each MeasObject in a BWP not including a frequency band of at least one I-BWP that has been configured, (M) Information for indicating whether a gap is necessary for measurement of each MeasObject in at least one BWP that has been configured and does not include a frequency band of an SS block for cell definition, and (N) Information for indicating whether a gap is necessary for at least one of measurement of cell quality of a serving cell and measurement of each MeasObject in at least one BWP that has been configured and does not include a frequency band of an SS block for cell definition, may be notified. Alternatively, the notification described above in a case that a BWP is configured may use a parameter (or an information element) other than interFreqNeedForGaps.

In addition, each of band combinations supported by the terminal apparatus 2 may include information of a frequency bandwidth for each band. Alternatively, information of the frequency bandwidth may be included for each band, regardless of the band combination. In a case that BWPs are configured, the frequency bandwidth information may indicate that a gap is not necessary for the measurement within the frequency bandwidth including the A-BWP, and a gap is necessary for the measurement outside the frequency bandwidth including the A-BWP. This allows the terminal apparatus 2 to notify whether a gap is necessary for the frequency position and the frequency bandwidth of the BWP by using a small amount of information. Alternatively, in addition to the information of the frequency bandwidth, information for indicating whether a gap is necessary for measurement of a frequency bandwidth other than the above-described frequency bandwidth including the A-BWP and/or information for indicating whether a gap is necessary for measurement of a frequency bandwidth other than the above-described frequency bandwidth including the D-BWP may be included.

The base station apparatus 3 may configure a gap (Type-2 gap) for the measurement of the cell quality of the serving cell for the terminal apparatus 2. For example, in the configuration of the gap, information relating to a timing (Periodicity and Offset) and a period (Duration) of an SS block for cell definition used for measurement and/or information of Duration may be included. In addition, the configuration of the gap may be a configuration of SMTC1. In a case that a Type-2 gap is configured, the terminal apparatus 2 may assume the SS block for cell definition not to be transmitted in a period other than the period in which the Type-2 gap is configured.

In addition, the terminal apparatus 2 in which the Type-2 gap is configured may switch the A-BWP to the I-BWP during the period in which the gap is configured. Furthermore, the terminal apparatus 2 in which the Type-2 gap is configured may switch from the I-BWP to the original BWP before the period in which the gap is configured ends. In addition, the terminal apparatus 2 in which the Type-2 gap is configured may deactivate the A-BWP during the period in which the gap is configured. In a case that the period in which the gap is configured ends, the terminal apparatus 2 in which the Type-2 gap is configured may activate the original BWP.

In addition, the message described above is an example, and the RRC reconfiguration message may include information other than the RRC reconfiguration message and may not include a part of the information of the RRC reconfiguration message described above. An RRC reconfiguration message may have a structure, an information element name, a message name, or a parameter name different from the RRC reconfiguration message described above.

This allows the base station apparatus 3 to configure appropriate radio resources for the terminal apparatus 2.

A configuration of the apparatus in the embodiment of the present invention will be described.

Figure 2:
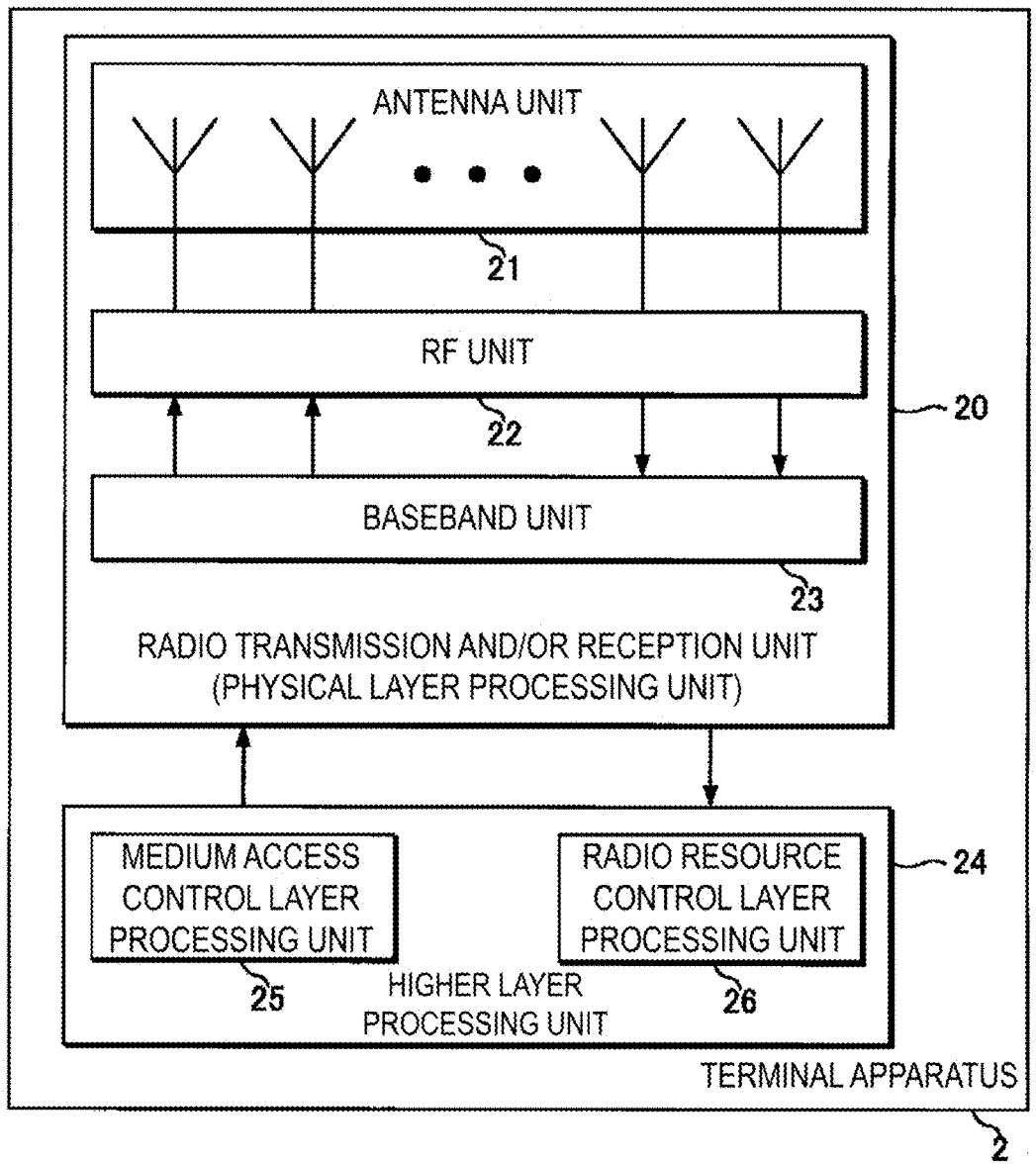
FIG. 2 is a block diagram schematically illustrating an example configuration of a terminal apparatus according to an embodiment of the present invention.

FIG. 2 is a schematic block diagram illustrating a configuration of the terminal apparatus 2 according to the present embodiment. As illustrated, the terminal apparatus 2 is configured to include a radio transmission and/or reception unit 20 and a higher layer processing unit 24. The radio transmission and/or reception unit 20 is configured to include an antenna unit 21, a radio frequency (RF) unit 22, and a baseband unit 23. The higher layer processing unit 24 is configured to include a medium access control layer processing unit 25 and a radio resource control layer processing unit 26. The radio transmission and/or reception unit 20 is also referred to as a transmitter, a receiver or a physical layer processing unit. A controller for controlling operations of the units based on various conditions may be separately provided.

The higher layer processing unit 24 outputs uplink data (a transport block) generated by a user's operation or the like to radio transmission and/or reception unit 20. The higher layer processing unit 24 performs some or all of the processes of the Medium Access Control (MAC) layer, the Packet Data Convergence Protocol (PDCP) layer, the Radio Link Control (RLC) layer, and the Radio Resource Control (RRC) layer. The higher layer processing unit 24 may include some or all of a medium access control layer processing unit, a packet data convergence protocol layer processing unit, a radio link control layer processing unit, and a radio resource control layer processing unit.

The medium access control layer processing unit 25 included in the higher layer processing unit 24 performs processing of the Medium Access Control layer. The medium access control layer processing unit 25 controls transmission of a scheduling request based on various types of configuration information/parameters managed by the radio resource control layer processing unit 26.

The radio resource control layer processing unit 26 included in the higher layer processing unit 24 performs processing of the Radio Resource Control layer. The radio resource control layer processing unit 26 manages various types of configuration information/parameters of its own apparatus. The radio resource control layer processing unit 26 sets various types of configuration information/parameters based on higher layer signaling received from the base station apparatus 3. Namely, the radio resource control layer processing unit 26 sets the various configuration information/parameters in accordance with the information indicating the various configuration information/parameters received from the base station apparatus 3.

The radio transmission and/or reception unit 20 performs processing of the physical layer, such as modulation, demodulation, coding, decoding, and the like. The radio transmission and/or reception unit 20 demultiplexes, demodulates, and decodes a signal received from the base station apparatus 3, and outputs the information resulting from the decoding to the higher layer processing unit 24. The radio transmission and/or reception unit 20 generates a transmit signal by modulating and coding data and transmits the generated transmit signal to the base station apparatus 3.

The RF unit 22 converts (down-coverts) a signal received through the antenna unit 21 into a baseband signal through orthogonal demodulation and removes unnecessary frequency components. The RF unit 22 outputs the processed analog signal to the baseband unit.

The baseband unit 23 converts the analog signal input from the RF unit 22 into a digital signal. The baseband unit 23 removes a part corresponding to a Cyclic Prefix (CP) from the converted digital signal, performs Fast Fourier Transform (FFT) of the signal acquired by removing the CP, and extracts a signal in the frequency domain.

The baseband unit 23 generates an SC-FDMA symbol by performing Inverse Fast Fourier Transform (IFFT) of the data, adds a CP to the generated SC-FDMA symbol, generates a baseband digital signal, and converts the baseband digital signal into an analog signal. The baseband unit 23 outputs the analog signal resulting from the conversion, to the RF unit 22.

The RF unit 22 removes unnecessary frequency components from the analog signal input from the baseband unit 23 using a low-pass filter, performs up-conversion of the analog signal into a signal of a carrier frequency, and transmits a resultant signal through the antenna unit 21. Furthermore, the RF unit 22 amplifies power. Furthermore, the RF unit 22 may have a function of controlling transmit power. The RF unit 22 is also referred to as a transmit power controller.

The terminal apparatus 2 may be configured to include multiple parts of the units or multiple sets of the units for supporting a transmission/reception process at multiple frequencies (frequency bands and frequency bandwidths) or in the same subframe in the cell.

FIG. 3 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit. A controller controlling operations of the units based on various conditions may be separately provided.

The higher layer processing unit 34 performs some or all of the processes of the Medium Access Control (MAC) layer, the Service Data Adaptation Protocol (SDAP) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 performs processes relating to a scheduling request based on various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates downlink data (a transport block) allocated in a physical downlink shared channel, system information, an RRC message, a MAC Control Element (CE), and the like or acquires them from a higher node and outputs them to the radio transmission and/or reception unit 30. Furthermore, the radio resource control layer processing unit 36 manages various types of configuration information/parameters for each of the terminal apparatuses 2. The radio resource control layer processing unit 36 may set various types of configuration information/parameters for each of the terminal apparatuses 2 via the higher layer signal. That is, the radio resource control layer processing unit 36 transmits/broadcasts information for indicating various types of configuration information/parameters.

The functionality of the radio transmission and/or reception unit 30 is similar to the functionality of the radio transmission and/or reception unit 20, and hence description thereof is omitted. Note that in a case that the base station apparatus 3 is connected to one or more transmission reception points 4, some or all of the functions of the radio transmission and/or reception unit 30 may be included in each of the transmission reception points 4.

Further, the higher layer processing unit 34 transmits (transfers) or receives control messages or user data between the base station apparatuses 3 or between a higher network apparatus (MME, S-GW (Serving-GW)) and the base station apparatus 3. In FIG. 3, although other constituent elements of the base station apparatus 3 and transmission paths of data (control information) between the constituent elements are omitted, it is apparent that multiple blocks having other functions required for the operation of the base station apparatus 3 are included as constituent elements. For example, a radio resource management layer processing unit and an application layer processing unit are provided in a higher layer of the radio resource control layer processing unit 36.

Note that "units" in the drawing refer to constituent elements to realize the functions and the procedures of the terminal apparatus 2 and the base station apparatus 3, which are also represented by the terms such as a section, a circuit, a constituting apparatus, a device, a unit, and the like.

Each of the units having the reference signs 20 to 26 included in the terminal apparatus 2 may be configured as a circuit. Each of the units having the reference signs 30 to 36 included in the base station apparatus 3 may be configured as a circuit.

Various aspects of the terminal apparatus 2 and the base station apparatus 3 according to the embodiment of the present invention will be described.

(1) According to a first aspect of the present invention, there is provided a terminal apparatus that communicates with a base station apparatus, the terminal apparatus including: a receiver configured to receive an RRC reconfiguration message from the base station apparatus; a transmitter configured to transmit an RRC reconfiguration completion message in response to the RRC reconfiguration message to the base station apparatus; and a controller configured to generate the RRC reconfiguration completion message, wherein the RRC reconfiguration completion message is generated that includes information for identifying whether a measurement gap is necessary to measure a serving cell quality of a serving cell, based on first downlink bandwidth part (BWP) information and no second downlink BWP information or one or more pieces of second downlink BWP information of the serving cell.

(2) In the first aspect of the present invention, the information for identifying whether the gap is necessary is information for each serving cell.

(3) In the first aspect of the present invention, the information for identifying whether the gap is necessary includes information for identifying whether the gap is necessary to measure the serving cell quality in a first downlink BWP.

(4) In the first aspect of the present invention, the information for identifying whether the gap is necessary includes information for identifying whether the gap is necessary to measure the serving cell quality in a downlink BWP.

(5) According to a second aspect of the present invention, there is provided a terminal apparatus that communicates with a base station apparatus, the terminal apparatus including: a transmitter configured to transmit a message for notifying capability of the terminal apparatus to the base station apparatus; and a controller configured to generate the message, wherein the message includes information of a first bandwidth for a frequency band for a combination of supported frequency bands, and the information of the first bandwidth indicates that the gap is unnecessary in measuring a measurement object included in the first bandwidth including at least a downlink bandwidth part (BWP) to be activated in a case that the downlink BWP is used for communication.

(6) In the second aspect of the present invention, the information of the first bandwidth indicates that the gap is necessary in measuring a measurement object not included in the first bandwidth including a downlink bandwidth part (BWP) to be activated in a case that the downlink BWP is used for communication.

(7) According to a third aspect of the present invention, there is provided a base station apparatus that communicates with a terminal apparatus, the base station apparatus including: a transmitter configured to transmit an RRC reconfiguration message to the terminal apparatus; a receiver configured to receive an RRC reconfiguration completion message in response to the RRC reconfiguration message from the terminal apparatus; and a controller configured to generate the RRC reconfiguration message, wherein the RRC reconfiguration message is generated that includes information for requesting information for identifying whether a measurement gap is necessary in measuring a serving cell quality of a serving cell based on a first downlink bandwidth part (BWP) information and no second downlink BWP information or one or more pieces of second downlink BWP information of the serving cell to be included in the RRC reconfiguration completion message.

(8) According to a fourth aspect of the present invention, there is provided a communication method applied to a terminal apparatus that communicates with a base station apparatus, the communication method including: receiving an RRC reconfiguration message from the base station apparatus; transmitting an RRC reconfiguration completion message in response to the RRC reconfiguration message to the base station apparatus; and generating the RRC reconfiguration completion message, wherein the RRC reconfiguration completion message is generated that includes information for identifying whether a measurement gap is necessary in measuring a serving cell quality of a serving cell, based on first downlink bandwidth part (BWP) information and no second downlink BWP information or one or more pieces of second downlink BWP information of the serving cell.

(9) According to a fifth aspect of the present invention, there is provided an integrated circuit implemented in a terminal apparatus that communicates with a base station apparatus, the integrated circuit causing the terminal apparatus to perform: receiving an RRC reconfiguration message from the base station apparatus; transmitting an RRC reconfiguration completion message in response to the RRC reconfiguration message to the base station apparatus; and generating the RRC reconfiguration completion message, wherein the RRC reconfiguration completion message is generated that includes information for identifying whether a measurement gap is necessary in measuring a serving cell quality of a serving cell, based on first downlink bandwidth part (BWP) information and no second downlink BWP information or one or more pieces of second downlink BWP information of the serving cell.

Consequently, the terminal apparatus 2 and the base station apparatus 3 can communicate efficiently.

Note that the embodiments discussed thus far are merely examples, and the embodiments can be implemented using various kinds of modifications, replacement, or the like. For example, an uplink transmission scheme can be applied to both communication systems of a Frequency Division Duplex (FDD) scheme and a Time Division Duplex (TDD) scheme. The names of the parameters, events, and the like indicated in the embodiments are given for the sake of convenience of description; therefore, even in a case that the actual applied names differ from the names in the embodiments of the present invention, the spirit of the invention claimed in the embodiments of the present invention is not affected in any way.

The term "connection" used in the respective embodiments is not limited to the configuration in which a certain device and another device are directly connected using a physical line, and includes a configuration in which the devices are logically connected, a configuration in which the devices are radio-connected using the radio technology, and the like.

The terminal apparatus 2 is also referred to as a user terminal, a mobile station apparatus, a communication terminal, a mobile apparatus, a terminal, User Equipment (UE), and a Mobile Station (MS). The base station apparatus 3 is also called a radio base station apparatus, a base station, a radio base station, a fixed station, a NodeB (NB), an evolved NodeB (eNB), a Base Transceiver Station (BTS), a Base Station (BS), an NR NodeB (NR NB), an NNB, a Transmission and Reception Point (TRP), and a next generation Node B (gNB).

The base station apparatus 3 according to one aspect of the present invention can also be implemented as an aggregation (an apparatus group) including multiple apparatuses. Each of the apparatuses constituting such an apparatus group may include some or all portions of each function or each functional block of the base station apparatus 3 according to the above-described embodiment. The apparatus group is required to have a complete set of functions or functional blocks of the base station apparatus 3. Furthermore, the terminal apparatus 2 according to the above-described embodiment can also communicate with the base station apparatus 3 as the aggregation.

Furthermore, the base station apparatus 3 according to the above-described embodiment may serve as an Evolved Universal Terrestrial Radio Access Network (EUTRAN) or a Next Generation Core network (NextGen Core). In addition, the base station apparatus 3 according to the embodiment described above may have some or all of the functions of a node higher than an eNodeB.

A program operating on an apparatus according to one aspect of the present invention may serve as a program that controls a Central Processing Unit (CPU) and the like to cause a computer to operate in such a manner as to realize the functions of the above-described embodiments according to one aspect of the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

2 Terminal apparatus
3 Base station apparatus
20, 30 Radio transmission and/or reception unit
21, 31 Antenna unit
22, 32 RF unit
23, 33 Baseband unit
24, 34 Higher layer processing unit
25, 35 Medium access control layer processing unit
26, 36 Radio resource control layer processing unit
4 Transmission Reception Point

The invention claimed is:

1. A terminal apparatus that communicates with a base station apparatus, the terminal apparatus comprising:
   a receiver configured to receive a radio resource control (RRC) reconfiguration message from the base station apparatus;
   a transmitter configured to transmit an RRC reconfiguration completion message to the base station apparatus in response to receiving the RRC reconfiguration message; and
   a controller configured to generate the RRC reconfiguration completion message,
   wherein the RRC reconfiguration completion message includes information for identifying whether a measurement gap is necessary to measure a quality of a serving cell based on one of (i) first downlink bandwidth part (BWP) information without any other downlink BWP information and (ii) the first downlink BWP information in combination with one or more pieces of second downlink BWP information of the serving cell.

2. The terminal apparatus of claim 1, wherein the information for identifying whether the measurement gap is necessary to measure the quality of the serving cell comprises information associated with each serving cell.

3. The terminal apparatus of claim 1, wherein the information for identifying whether the measurement gap is necessary to measure the quality of the serving cell includes information for identifying whether the measurement gap is necessary to measure the quality of the serving cell in an initial downlink BWP.

4. The terminal apparatus of claim 1, wherein the information for identifying whether the measurement gap is necessary to measure the quality of the serving cell includes information for identifying whether the measurement gap is necessary to measure the quality of the serving cell in any downlink BWP.

5. A terminal apparatus that communicates with a base station apparatus, the terminal apparatus comprising:
- a transmitter configured to transmit, to the base station apparatus, a message regarding a capability of the terminal apparatus; and
- a controller configured to generate the message, wherein:
- the message includes information about a first bandwidth for a frequency band for a combination of supported frequency bands, and
- the information about the first bandwidth indicates that a measurement gap is unnecessary in measuring a measurement object included in the first bandwidth, wherein the measurement object includes at least a downlink bandwidth part (BWP) to be activated in a case that the downlink BWP is used for communication between the terminal apparatus and the base station apparatus.

6. The terminal apparatus of claim 5, wherein the information about the first bandwidth indicates that the measurement gap is necessary in measuring a measurement object not included in the first bandwidth, including a downlink bandwidth part BWP to be activated in a case that the downlink BWP is used for the communication between the terminal apparatus and the base station apparatus.

7. A base station apparatus that communicates with a terminal apparatus, the base station apparatus comprising:
- a transmitter configured to transmit a radio resource control (RRC) reconfiguration message to the terminal apparatus;
- a receiver configured to receive an RRC reconfiguration completion message from the terminal apparatus in response to transmitting the RRC reconfiguration message; and
- a controller configured to generate the RRC reconfiguration message,
- wherein the RRC reconfiguration message includes information for requesting information for identifying whether a measurement gap is necessary in measuring a quality of a serving cell based on one of (i) first downlink bandwidth part (BWP) information without any other downlink BWP information and (ii) the first downlink BWP information in combination with one or more pieces of second downlink BWP information of the serving cell to be included in the RRC reconfiguration completion message.

8. A communication method applied to a terminal apparatus that communicates with a base station apparatus, the communication method comprising:
- receiving a radio resource control (RRC) reconfiguration message from the base station apparatus; and
- generating and transmitting an RRC reconfiguration completion message to the base station apparatus in response to receiving the RRC reconfiguration message,
- wherein the RRC reconfiguration completion message includes information for identifying whether a measurement gap is necessary in measuring a quality of a serving cell based on one of (i) first downlink bandwidth part (BWP) information without any other downlink BWP information and (ii) the first downlink BWP information in combination with one or more pieces of second downlink BWP information of the serving cell.

9. An integrated circuit implemented in a terminal apparatus that communicates with a base station apparatus, the integrated circuit causing the terminal apparatus to:
- receive a radio resource control (RRC) reconfiguration message from the base station apparatus; and
- generate and transmit an RRC reconfiguration completion message to the base station apparatus in response to receiving the RRC reconfiguration message,
- wherein the RRC reconfiguration completion message includes information for identifying whether a measurement gap is necessary in measuring a quality of a serving cell based on one of (i) first downlink bandwidth part (BWP) information without any other downlink BWP information and (ii) the first downlink BWP information in combination with one or more pieces of second downlink BWP information of the serving cell.

* * * * *